US012731133B2

(12) United States Patent
Liu et al.

(10) Patent No.: US 12,731,133 B2
(45) Date of Patent: Sep. 8, 2026

(54) METHOD FOR DIGITAL CURRENCY INTRA-CHAIN AND CROSS-CHAIN OFF-CHAIN SWAPS BASED ON TRUSTED HARDWARE

(71) Applicant: ZHEJIANG UNIVERSITY, Zhejiang (CN)

(72) Inventors: Jian Liu, Hangzhou (CN); Di Wu, Hangzhou (CN); Kui Ren, Hangzhou (CN); Wu Wen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 21 days.

(21) Appl. No.: 19/048,868

(22) Filed: Feb. 8, 2025

(65) Prior Publication Data

US 2025/0299185 A1 Sep. 25, 2025

(30) Foreign Application Priority Data

Mar. 19, 2024 (CN) ........................ 202410312613.2

(51) Int. Cl.
*G06Q 20/38* (2012.01)
*G06Q 20/06* (2012.01)

(52) U.S. Cl.
CPC ..... *G06Q 20/3823* (2013.01); *G06Q 20/0658* (2013.01); *G06Q 20/3825* (2013.01); *G06Q 20/3829* (2013.01)

(58) Field of Classification Search
None
See application file for complete search history.

(56) References Cited

U.S. PATENT DOCUMENTS

2025/0117789 A1* 4/2025 Zarick ................ G06Q 20/3676

FOREIGN PATENT DOCUMENTS

CN 113362940 A * 9/2021 ............. G06Q 40/04
JP 2004523171 A * 7/2004 ........... H04L 9/3247

* cited by examiner

*Primary Examiner* — Neha Patel
*Assistant Examiner* — Nicholas K Phan
(74) *Attorney, Agent, or Firm* — Wiersch Law Group

(57) ABSTRACT

A digital currency intra-chain and cross-chain off-chain swap method based on trusted hardware. An initiator sends a swap message containing a public-private key pair to be swapped by a initiator to a responder, and deletes the public-private key pair to be swapped by the initiator; after receiving the swap message, the responder saves and locks the public-private key pair to be swapped by the initiator, locks the public-private key pair to be swapped by the responder, and sends a response message containing the public-private key pair to the initiator; after receiving the response message, the initiator saves the public-private key pair to be swapped by the responder and sends a confirmation message to the responder; after receiving the confirmation message, the responder deletes the public-private key pair to be swapped by the responder and unlocks the public-private key pair to be swapped by the initiator to complete the swap.

10 Claims, 5 Drawing Sheets

Software system

Trusted hardware system

Initiator

Software system

Trusted hardware system

Responder

FIG. 1

METHOD FOR DIGITAL CURRENCY INTRA-CHAIN AND CROSS-CHAIN OFF-CHAIN SWAPS BASED ON TRUSTED HARDWARE

CROSS-REFERENCE TO RELATED APPLICATIONS

The present application claims priority to Chinese Patent Application No. 202410312613.2, filed on Mar. 19, 2024, the content of which is incorporated herein by reference in its entirety.

TECHNICAL FIELD

The present disclosure belongs to the field of information technology, and in particular, to a method for digital currency intra-chain and cross-chain off-chain swaps based on trusted hardware.

BACKGROUND

With the rapid development of blockchain technology, digital currency has become a mainstream financial asset. The characteristics of the digital currency include decentralization, strong transparency, and non-tamperability. However, as the volume of digital currency transactions increases, traditional on-chain transaction methods are facing various challenges, including slow transaction speeds, high fees, poor scalability and other issues.

Moreover, with the emergence of numerous different digital currencies and central bank digital currencies, the demand for cross-chain transactions is gradually increasing. However, most off-chain transaction systems do not support cross-chain payments.

In this regard, the publicly disclosed patent titled "Method for Digital Currency Intra-chain and Cross-chain Off-chain Payments based on Trusted Hardware" provides a solution based on trusted hardware, offering high off-chain transaction performance and security.

In addition, when combined with the publicly disclosed patent titled "Method for Digital Currency Intra-chain and Cross-chain Off-chain Rescuable Payments based on Trusted Hardware", the above-mentioned off-chain payment method and system ensure that digital currency assets are not lost when the trusted hardware is damaged or lost. However, these payment solutions cannot securely and efficiently swap digital currency assets.

With the rise of cross-chain transactions and non-fungible tokens (NFTs), there is a growing demand for exchanging digital currency assets across or within the chain. However, the current popular centralized swap solutions including centralized swap and cross-chain bridge suffer from security issues, while the popular decentralized swap solutions including UniSwap-type decentralized transaction contract and atomic swap based on hash time lock face efficiency issues.

Therefore, it is necessary to develop a safe and efficient off-chain swap system and method. In this regard, the off-chain payment method combined with an optimistic fair exchange protocol provides a potential solution.

SUMMARY

In view of the problems existing in the prior art, the object of the embodiment of the application is to provide a method for digital currency intra-chain and cross-chain off-chain swaps based on trusted hardware.

According to a first aspect of an embodiment of the present disclosure, there is provided a method for digital currency intra-chain and cross-chain off-chain swaps based on trusted hardware, including the following steps:

(1) Randomly generating, by a trusted hardware system of an initiator, a public-private key pair $$(pk_A^{TEE}, sk_A^{TEE}),$$

generating a signature $\sigma_A$ for a public key $$pk_A^{TEE}$$

by using a signature private key $\widetilde{sk}_A^{\mathrm{TEE}}$ of the trusted hardware system of the initiator, and sending the public key $$pk_A^{TEE}$$

and the signature $\sigma_A$ to a software system of the initiator.

(2) Calculating, by the software system of the initiator, a digital currency address addr through the public key $$pk_A^{TEE},$$

and depositing a digital currency into the digital currency address through a blockchain; sending, by the software system of the initiator, the public key $$pk_A^{TEE},$$

a type of the digital currency, an initiator rescue address $addr_A$ preset by the initiator and an earliest rescue time $t_A$ expected by the initiator to the trusted hardware system of the initiator, requesting the hardware system of the initiator to generate a rescue object for $$(pk_A^{TEE}, sk_A^{TEE}),$$

and returning, by the trusted hardware system of the initiator, the generated rescue object and a signature $\sigma_{t_A}$:

(3) Randomly generating, by a trusted hardware system of a responder, a public-private key pair $$(pk_B^{TEE}, sk_B^{TEE}),$$

generating a signature $\sigma_B$ for a public key $$pk_B^{TEE}$$

by using a signature private key $\widetilde{sk}_B^{\mathrm{TEE}}$ of the trusted hardware system of the responder, and returning the public key $$pk_B^{TEE}$$

and the signature $\sigma_B$ to the software system of the responder.

(4) Calculating, by the software system of the responder, a digital currency address addr' through the public key $$pk_B^{TEE},$$

and depositing a digital currency into the digital currency address through a blockchain; sending, by the software system of the responder, the public key $$pk_B^{TEE},$$

a type of the digital currency, an responder rescue address $addr_B$ preset by the responder, and an earliest rescue time $t_B$ expected by the responder to the trusted hardware system of the responder, requesting the rusted hardware system of the responder to generate a rescue object for $$(pk_B^{TEE}, sk_B^{TEE}),$$

and returning, by the trusted hardware system of the responder, the generated rescue object and a signature $\sigma_{t_B}$.

(5) Sending, by the software system of the initiator, the digital currency address addr and the earliest rescue time $t_A$ expected by the initiator to the software system of the responder, and verifying, by the software system of the responder, whether there is a corresponding digital currency at addr and confirming whether to accept the earliest rescue time $t_A$ expected by the initiator; when the responder does not accept the earliest rescue time $t_A$ expected by the initiator, terminating a transaction, otherwise, determining whether $t_B-t_A$ is greater than two fixed time intervals, each of which refers a block confirmation period in the payment method, where each block confirmation period is 10 minutes, when $t_B-t_A$ being not greater than the two fixed time intervals, terminating the transaction, and when $t_B-t_A$ being greater than the two fixed time intervals, sending, by the software system of the responder, a trusted hardware signature public key $\widetilde{pk}_B^{\mathrm{TEE}}$ of the responder and a trusted hardware encryption public key $\widehat{pk}_B^{\mathrm{TEE}}$ of the responder to the software system of the initiator.

(6) Sending, by the software system of the responder, the digital currency address addr' and the earliest rescue time $t_B$ expected by the responder to the software system of the initiator, and verifying, by the software system of the initiator, whether there is a corresponding digital currency at addr' and confirming whether to accept the earliest rescue time $t_B$ expected by the responder; when the initiator does not accept the earliest rescue time $t_B$ expected by the responder, terminating a transaction, otherwise, determining whether $t_B-t_A$ is greater than two fixed time intervals, when $t_B-t_A$ being not greater than the two fixed time intervals, terminating the transaction, and when $t_B-t_A$ being greater than the two fixed time intervals, sending, by the software system of the initiator, a trusted hardware signature public key $\widetilde{pk}_A^{\mathrm{TEE}}$ of the initiator and a trusted hardware encryption public $\widehat{pk}_A^{\mathrm{TEE}}$ of the initiator to the software system of the responder.

(7) Sending, by the software system of the initiator, the public key $$pk_A^{TEE},$$

the trusted hardware encryption public key $\widehat{pk}_B^{\mathrm{TEE}}$ of the responder, and a rescue address $addr_{A'}$ preset by the initiator located in a same blockchain system as the digital currency address addr' to the trusted hardware system of the initiator, and requesting the trusted hardware system of the initiator to transfer $$(pk_A^{TEE}, sk_A^{TEE});$$

and performing, by the trusted hardware system of the initiator, asymmetric encryption on $$sk_A^{TEE},$$

by using $\widehat{pk}_B^{\mathrm{TEE}}$, to generate a ciphertext $C_A$, deleting $$(pk_A^{TEE}, sk_A^{TEE})$$

from a confidential storage space, and signing $C_A$ and $addr_{A'}$, respectively, by using the trusted hardware signature private key $\widetilde{sk}_A^{\mathrm{TEE}}$ to generate signatures $\sigma_{C_A}$ and $\sigma_{addr_{A'}}$ and sending $C_A$, $\sigma_{C_A}$, and $\sigma_{addr_{A'}}$, to the software system of the initiator.

(8) Sending, by the software system of the initiator, the public key $$pk_A^{TEE},$$

the signature $\sigma_A$, the ciphertext $C_A$, the signature $\sigma_{C_A}$, the earliest rescue time $t_A$ expected by the initiator, the signature $\sigma_{C_A}$, the rescue address $addr_{A'}$ of the initiator and the signature $\sigma_{addr_{A'}}$ to the software system of the responder.

(9) Sending, by the software system of the responder, the public key $$pk_A^{TEE},$$

the signature $\sigma_A$, the ciphertext $C_A$, the signature $\sigma_{C_A}$, the earliest rescue time $t_A$ expected by the initiator, the signature $\sigma_{t_A}$, the rescue address $addr_{A'}$ of the initiator, the signature $\sigma_{addr_{A'}}$, the trusted hardware signature public key $\widetilde{pk}_A^{TEE}$ of the initiator, the trusted hardware encryption public key $\widehat{pk}_A^{TEE}$ of the initiator, the public key $$pk_B^{TEE},$$

the earliest rescue time $t_B$ expected by the responder, the signature $\sigma_{t_B}$, and a rescue address $addr_{B'}$ preset by the responder located in a same blockchain system as the digital currency address addr to the trusted hardware of the responder, using, by the trusted hardware system, $\widetilde{pk}_A^{TEE}$ to verify whether $\sigma_A$ is a signature for $$pk_A^{TEE}$$

by the trusted hardware system of the initiator using $\widetilde{sk}_A^{TEE}$, whether $\sigma_{C_A}$ is a signature for $C_A$ by the trusted hardware system of the initiator using $\widetilde{sk}_A^{TEE}$, whether $\sigma_{t_A}$ is a signature for $t_A$ by the trusted hardware system of the initiator using $\widetilde{sk}_A^{TEE}$, whether $\sigma_{addr_{A'}}$ is a signature for $addr_{A'}$ by the trusted hardware system of the initiator using $\widetilde{sk}_A^{TEE}$, and using $\widetilde{pk}_B^{TEE}$ to verify whether $\sigma_{t_B}$ is signature for $t_B$ by the trusted hardware system of the responder using $\widetilde{sk}_B^{TEE}$, when verifying being passed, verifying whether $t_B-t_A$ is greater than two fixed time intervals, and when verifying being further passed, performing, by $\widehat{sk}_B^{TEE}$, asymmetric decryption on $C_A$ to obtain $$sk_A^{TEE},$$

storing $$(pk_A^{TEE}, sk_A^{TEE})$$

into the confidential storage space of the trusted hardware system of the responder, setting the public-private key pair to a locked state, and deleting $$(pk_B^{TEE}, sk_B^{TEE})$$

from the confidential storage space; performing, by the trusted hardware system of the responder, asymmetric encryption on $$sk_B^{TEE}$$

by using $\widehat{pk}_A^{TEE}$, to generate a ciphertext $C_B$, and sign $C_B$ by using the trusted hardware signature private key $\widetilde{sk}_B^{TEE}$ to generate a signature $\sigma_{C_B}$; and generating, by the trusted hardware of the responder, a special rescue object for $$(pk_A^{TEE}, sk_A^{TEE}),$$

with an expected rescue time being a time $t'_A$ that is earlier than $t_A$ by at least a fixed time interval, with a rescue address being $addr_{B'}$, with a payload being the data of a blockchain transaction $tx_{R'}$ of immediately transferring from addr' to $addr_{A'}$ that meets a digital currency type, and returning, by the trusted hardware system of the responder, $C_B$, $\sigma_{C_B}$ and the special rescue object to the software system of the responder.

(10) Sending, by the software system of the responder, the public key $$pk_B^{TEE},$$

the signature $\sigma_B$, the ciphertext $C_B$, the signature $\sigma_{C_B}$, the earliest rescue time $t_B$ expected by the responder and the signature $\sigma_{t_B}$ to the software system of the initiator.

(11) Sending, by the software system of the initiator, the public key $$pk_B^{TEE},$$

the signature $\sigma_B$, the ciphertext $C_B$, the signature $\sigma_{C_B}$, the earliest rescue time $t_B$ expected by the responder and the signature $\sigma_{t_B}$, the trusted hardware signature public key $\widetilde{pk}_B^{TEE}$ of the responder, the earliest rescue time $t_A$ expected by the initiator and the signature $\sigma_{t_A}$ to the trusted hardware system of the initiator, using, by the trusted hardware system of the initiator, $\widetilde{pk}_B^{TEE}$ to verify whether $\sigma_B$ is a signature for $$pk_B^{TEE}$$

by the trusted hardware system of the responder using $\widetilde{sk}_B^{TEE}$, whether $\sigma_{C_B}$ is a signature for $C_B$ by the trusted hardware system of the responder using $\widetilde{sk}_B^{TEE}$, and whether $\sigma_{t_B}$ is a signature for $t_B$ by the trusted hardware system of the responder using $\widetilde{sk}_B^{TEE}$, and using $\widetilde{pk}_A^{TEE}$ to verify whether $\sigma_{t_A}$ is a signature for $t_A$ by the trusted hardware system of the initiator using $\widetilde{sk}_A^{TEE}$, when verifying being passed, verifying whether $t_B-t_A$ is greater than two fixed time intervals, and when verifying being further passed, performing, by $\widehat{sk}_A^{TEE}$, asymmetric decryption on $C_B$ to obtain $$sk_B^{TEE},$$

storing $$(pk_B^{TEE}, sk_B^{TEE})$$

into the confidential storage space of the trusted hardware system of the initiator, signing, by $\widetilde{sk}_A^{TEE}$, $$pk_B^{TEE}$$

to generate a signature $\sigma_{B'}$, performing, by $\widetilde{pk}_A^{TEE}$, asymmetric encryption on a completion symbol to generate a ciphertext $C'_A$, signing, by $\widetilde{sk}_A^{TEE}$, $C'_A$ to generate a signature $\sigma_{C'_A}$, and returning $\sigma_{B'}$, $C'_A$, and $\sigma_{C'_A}$ to the software system of the initiator.

(12) Sending, by the software system of the initiator, the ciphertext $C'_A$ and the signature $\sigma_{C'_A}$ to the software system of the responder.

(13) Sending, by the software system of the responder, the ciphertext $C'_A$, the signature $\sigma_{C'_A}$ and the trusted hardware signature public key $\widetilde{pk}_A^{TEE}$ of the initiator to the trusted hardware system of the responder, using, by the trusted hardware system of the responder, $\widetilde{pk}_A^{TEE}$ to verify whether $\sigma_{C'_A}$ is a signature for $C'_A$ by the trusted hardware system of the initiator using $\widetilde{sk}_A^{TEE}$, when the verifying being passed, performing, by $\widetilde{sk}_B^{TEE}$, asymmetric decryption on $C'_A$, and when the ciphertext $C'_A$ being decrypted to obtain the completion symbol, removing the locked state of $$(pk_A^{TEE}, sk_A^{TEE}),$$

signing, by $\widetilde{sk}_B^{TEE}$, $$pk_A^{TEE}$$

to generate a signature $\sigma_{A'}$, and returning $\sigma_{A'}$ to the software system of the responder.

Further, if the initiator needs to withdraw the digital currency in the digital currency account/address addr' corresponding to $$pk_B^{TEE}$$

after executing the step (13), then the following steps are executed:

Inputting, by the initiator, a public key $pk_{A'}$ and the public key $$pk_B^{TEE}$$

to the trusted hardware system of the initiator through the software system of the initiator, requesting the trusted hardware system of the initiator to transfer $$(pk_B^{TEE}, sk_B^{TEE}),$$

performing, by the trusted hardware the initiator, asymmetric encryption on $$sk_B^{TEE},$$

by using $pk_{A'}$, to generate a ciphertext $C_{B'}$, deleting $$(pk_B^{TEE}, sk_B^{TEE})$$

from the confidential storage space, signing, by the trusted hardware signature private key $\widetilde{sk}_A^{TEE}$, $C_{B'}$ to generate a signature $\sigma C_{B'}$, and returning $C_{B'}$ and $\sigma_{C_{B'}}$ to the software system of the initiator Using, by the software system of the initiator, $\widetilde{pk}_A^{TEE}$ to verify whether $\sigma_{B'}$ is a signature for $$pk_B^{TEE}$$

by the trusted hardware system of the initiator using $\widetilde{sk}_A^{TEE}$, using $\widetilde{pk}_A^{TEE}$ to verify whether $\sigma_{C_{B'}}$ is the signature for $C_{B'}$ by the trusted hardware system of the initiator using $\widetilde{sk}_A^{TEE}$, when verifying being passed, decrypting, by the corresponding private key $sk_{A'}$ of the public key $pk_{A'}$, the ciphertext $C_{B'}$ to obtain $$sk_B^{TEE},$$

using, by the software system of the initiator, $$(pk_B^{TEE}, sk_B^{TEE})$$

to generate a transaction of transferring from addr' to a personal digital currency address of the initiator, and submitting the transaction to the blockchain for digital currency withdrawal.

Further, if the responder needs to withdraw the digital currency in the digital currency account/address addr corresponding to $$pk_A^{TEE}$$

after executing the step (13), then the following steps are executed:

Inputting, by the responder, a public key $pk_{B'}$ and the public key $$pk_A^{TEE}$$

to the trusted hardware system of the responder through the software system of the responder, requesting the trusted hardware system of the responder to transfer $$\left(pk_A^{TEE}, sk_A^{TEE}\right),$$

and performing, by the trusted hardware the responder, asymmetric encryption on $$sk_A^{TEE}$$

by using $pk_{B'}$, to generate a ciphertext $C_{A'}$, deleting $$\left(pk_A^{TEE}, sk_A^{TEE}\right)$$

from the confidential storage space, signing, by the trusted hardware signature private key $\widetilde{sk}_B^{TEE}$, $C_{A'}$ to generate a signature $\sigma_{C_{A'}}$, and returning $C_{A'}$ and $\sigma_{C_{A'}}$ to the software system of the responder.

Using, by the software system of the responder, $\widetilde{pk}_B^{TEE}$ to verify whether $\sigma_{A'}$ is a signature for $$pk_A^{TEE}$$

by the trusted hardware system of the responder using $\widetilde{sk}_B^{TEE}$, and using $\widetilde{pk}_B^{TEE}$ to verify whether $\sigma_{C_{A'}}$ is the signature for $C_{A'}$ by the trusted hardware system of the responder using $\widetilde{sk}_B^{TEE}$, when verifying being passed, decrypting, by the corresponding private key $sk_{B'}$ of the public key $pk_{B'}$, the ciphertext $C_{B'}$ to obtain $$sk_A^{TEE},$$

and using, by the software system of the responder, $$\left(pk_A^{TEE}, sk_A^{TEE}\right)$$

to generate a transaction of transferring from addr to a personal digital currency address of the responder, and submitting the transaction to the blockchain for digital currency withdrawal.

Further, in the step (2), for a digital currency, comprising but not limited to bitcoin, that supports deferred transactions, generating, by the trusted hardware system of the initiator, a transaction $tx_A$ signed with $$sk_A^{TEE},$$

with a nTimeLock field being the earliest rescue time $t_A$ expected by the initiator and a SIGHASH flag bit being SIGHASH_ALL, and transferred from addr to $addr_A$, and returning the transaction $tx_A$ to the software system of the initiator as a rescue object.

For a digital currency, comprising but not limited to Ethereum, that does not support deferred transactions but supports smart contracts, generating, by the trusted hardware system of the initiator, a called transaction $call_A$ that calls a deferred transfer function of a smart contract that supports the deferred transactions to realize transferring from addr to $addr_A$ and has an earliest executable time of $t_A$, and returning the transaction $call_A$ to the software system of the initiator as a rescue object.

For a digital currency that does not support deferred transactions nor smart contracts, obtaining, by the trusted hardware system of the initiator, a current time $t_{now}$ through a trusted clock or trusted timing point, and generates a time lock puzzle $puzzle_A$ with a secret being a blockchain transaction that immediately transfers the digital currency at addr to $addr_A$, a computing performance being a current computing performance constant and an unlocking duration being $t-t_{now}$ through a generation algorithm in time lock puzzle algorithms, and returning the time lock puzzle to the software system of the initiator as a rescue object.

Further, using, by the initiator, the rescue object to retrieve the digital currency deposited at addr to the rescue address $addr_A$ of the initiator after $t_A$ is specifically as follows:

For a digital currency, comprising but not limited to Bitcoin, that supports deferred transactions, after submitting the earliest rescue time $t_A$ expected by the initiator, submitting, by the initiator, $tx_A$ to a blockchain system through the software system of the initiator or any blockchain client supporting the digital currency, and retrieving the digital currency deposited at addr to the rescue address addr after confirmation by the blockchain system.

For a digital currency, comprising but not limited to Ethereum, that does not support deferred transactions but supports smart contracts, after submitting the earliest rescue time $t_A$ expected by the initiator, submitting, by the initiator, call to the blockchain system through the software system of the initiator or any blockchain client that supports the digital currency, and retrieving the digital currency deposited at addr to the rescue address $addr_A$ after confirmation by the blockchain system.

For a digital currency that does not support deferred transactions nor smart contracts, immediately starting, by the initiator, to execute a decryption algorithm of the corresponding time lock puzzle algorithm after obtaining $puzzle_A$, and solving, by the initiator, $puzzle_A$ to obtain $$sk_A^{TEE}$$

before and after the earliest rescue time $t_A$ expected by the initiator, generating a transaction of transferring from addr to the personal digital currency address of the initiator with the software system, and submitting the transaction to the blockchain to retrieve the digital currency.

Further, in the step (4), for the digital currency, comprising but not limited to Bitcoin, that supports deferred transactions, generating, by the trusted hardware system of the responder, a transaction $tx_B$ signed with $$sk_B^{TEE},$$

with a nTimeLock field being the earliest rescue time $t_B$ expected by the responder, and a SIGHASH flag bit being SIGHASH_ALL, and transferred from addr' to $addr_B$, and returning the transaction $tx_B$ to the software system of the responder as a rescue object.

For the digital currency, comprising but not limited to Ethereum, that does not support deferred transactions but supports smart contracts, generating, by the trusted hardware system of the responder, a called transaction $call_B$ that calls a deferred transfer function of a smart contract that supports the deferred transactions to realize transferring from addr' to $addr_B$ and has an earliest executable time of $t_B$, and returning the transaction $call_B$ to the software system of the responder as a rescue object.

For the digital currency, which does not support deferred transactions nor smart contracts, obtaining, by the trusted hardware system of the responder, a current time $t_{now}$, through a trusted clock or trusted timing point, and generates a time lock puzzle $puzzle_B$ with a secret being a blockchain transaction that immediately transfers the digital currency at addr' to $addr_B$, a computing performance being a current computing performance constant and an unlocking duration being $t_B - t_{now}$, through a generation algorithm in time lock puzzle algorithms, and returning the time lock puzzle to the software system of the responder as a rescue object.

Further, after the step (10), when the responder does not receive a reply from the responder after waiting for any period of time and guesses that the initiator is a malicious party, submitting the special rescue object obtained in the step (9) to the digital currency system where addr is located after $t'_A$ by a corresponding rescue method, and transferring the digital currency at addr to $addr_{B'}$ to terminate a swap.

Further, when the initiator finds out, by a blockchain browser built in the software system of the initiator or other blockchain browsers or any method, that the digital currency at addr is taken out before $t_A$, determining that the responder uses the special rescue object for retrieval, and the initiator extracts, by the blockchain browser built in the software system of the initiator or other blockchain browsers or any method, $tx_{R'}$ from the payload of the transaction of the digital currency taken out from addr, submits $tx_{R'}$ to the blockchain, and transfers the digital currency at addr' to the rescue address $addr_A$ preset by the initiator to complete a swap.

According to a second aspect of an embodiment of the present disclosure, there is provided an electronic device, comprising: one or more processors; and a memory for storing one or more programs. When the one or more programs are executed by the one or more processors, the one or more processors are caused to implement the above method according to the first aspect.

The technical solution provided by the embodiment of the present disclosure may have the following beneficial effects: as can be seen from the above embodiments of the present disclosure, the initiator sends a swap message containing a public-private key pair to be swapped by a initiator to a responder, and deletes the public-private key pair to be swapped by the initiator. After receiving the swap message, the responder saves and locks the public-private key pair to be swapped by the initiator, locks the public-private key pair to be swapped by the responder, and sends a response message containing the public-private key pair to the initiator. After receiving the response message, the initiator saves the public-private key pair to be swapped by the responder and sends a confirmation message to the responder. After receiving the confirmation message, the responder deletes the public-private key pair to be swapped by the responder and unlocks the public-private key pair to be swapped by the initiator to complete the swap. Compared with the related art, the method ensures the security of the swap process by using public-private key pairs during the off-chain swap process, and the swap parties only share public-private key pairs when necessary, reducing the risk of leaking sensitive information and avoiding the delay and performance loss associated with executing smart contracts on the blockchain. The method provides an effective solution for secure, efficient, and cross digital currency off-chain swap, promoting the flow and transaction of digital assets.

It is to be appreciated that both the foregoing general description and the following detailed description are exemplary and explanatory only and are not restrictive of the present disclosure.

BRIEF DESCRIPTION OF DRAWINGS

The accompanying drawings, which are incorporated in and constitute a part of this specification, illustrate embodiments consistent with this application and together with the description, serve to explain the principles of the present disclosure.

FIG. 1 is an application scenario architecture diagram of a digital currency off-chain swap method based on trusted hardware according to an exemplary embodiment.

DESCRIPTION OF EMBODIMENTS

Reference will now be made in detail to exemplary embodiments, examples of which are illustrated in the accompanying drawings. When the following description refers to the drawings, unless otherwise indicated, the same numbers in different drawings indicate the same or similar elements. The embodiments described in the following exemplary embodiments do not represent all embodiments consistent with the present disclosure.

The terminology used in the present disclosure is for the purpose of describing specific embodiments only and is not intended to limit the present disclosure. The singular forms “a”, “said” and “the” used in the present disclosure and the appended claims are further intended to include the plural forms, unless the context clearly indicates other meaning. It should further be understood that the term “and/or” as used herein refers to and includes any or all possible combinations of one or more associated listed items.

It should be understood that although the terms first, second, third, etc. may be used in the present disclosure to describe various information, this information should not be limited to these terms. These terms are only used to distinguish the same type of information from each other. For example, without departing from the scope of the present disclosure, the first information can further be called the second information, and similarly, the second information can further be called the first information. Depending on the context, the word "if" as used herein can be interpreted as when" or "in case of" or "in response to a determination".

Figure 1:
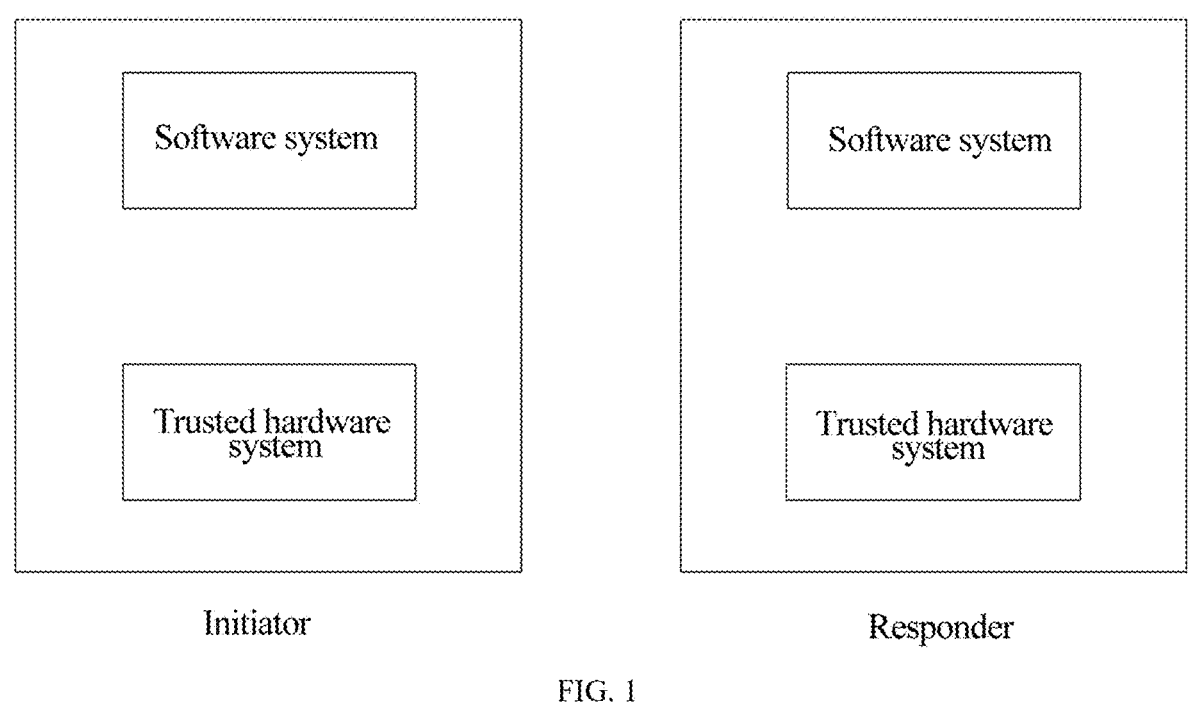

The method for digital currency intra-chain and cross-chain off-chain swaps based on trusted hardware in the embodiment of the present disclosure mainly involves two participants, namely an initiator and a responder. The initiator and the responder can be institutions (such as commercial banks) or ordinary users (such as commodity buyers and sellers). The digital currency swap transaction can take place under the scenes of off-chain commodity transaction and online electronic payment. As shown in FIG. 1, both the initiator and the responder have a software system running on a computer device or a mobile device and a trusted hardware system running on trusted hardware. Understandably, in practice, the same user can appear as the initiator and the responder in different digital currency transactions.

Figure 2:
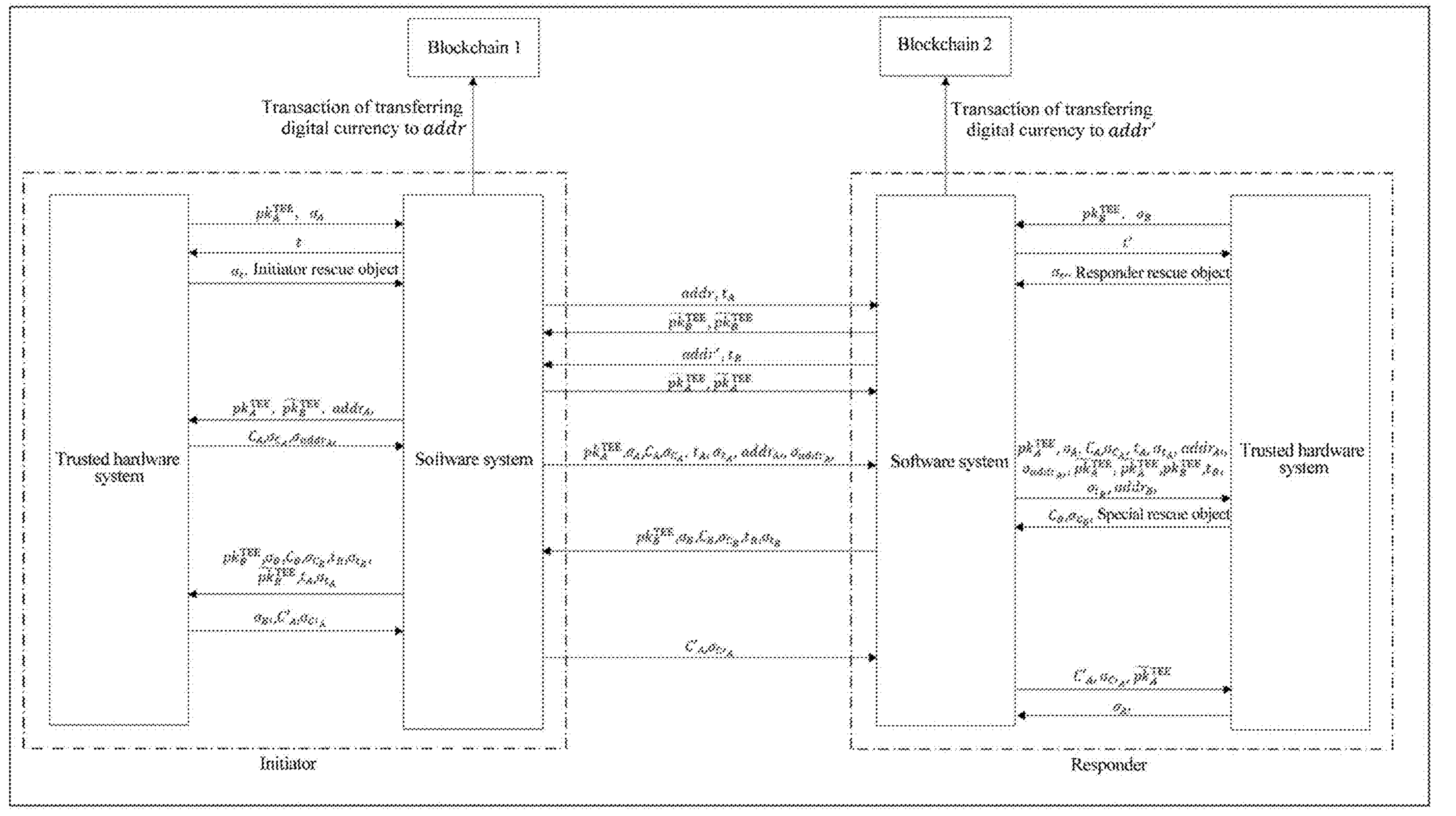
FIG. 2 is a schematic diagram of the main steps of the digital currency off-chain swap method based on trusted hardware according to an exemplary embodiment.

FIG. 2 is a schematic diagram of a method for digital currency intra-chain and cross-chain off-chain swaps based on trusted hardware according to an exemplary embodiment. As shown in FIG. 2, the method mainly involves the following steps:

(1) A trusted hardware system of an initiator randomly generates a public-private key pair $$(pk_A^{TEE}, sk_A^{TEE}),$$

generates a signature $\sigma_A$ for a public key $$pk_A^{TEE}$$

by using its own signature private key $\widetilde{sk}_A^{\mathrm{TEE}}$, and sends the public key $$pk_A^{TEE}$$

and the signature $\sigma_A$ to a software system of the initiator.

This step generates a public-private key pair stored and controlled by trusted hardware through the trusted hardware system, which makes it possible to create a secure blockchain account controlled and managed by trusted hardware in the following steps. In this step, the trusted hardware system of the initiator saves the public-private key pair $$(pk_A^{TEE}, sk_A^{TEE})$$

as confidential content in a confidential storage space, including directly storing it in the trusted hardware or encrypting it by the trusted hardware with a key that will not leak and storing it in a specific area, and the private key cannot be read by any device, system, software or user except the trusted hardware system in any way.

It should be noted that each trusted hardware system automatically generates two public-private key pairs randomly after initialization: 1) the trusted hardware encryption public-private key pair ($\widehat{pk}^{\mathrm{TEE}}$, $\widehat{pk}^{\mathrm{TEE}}$), where the former is a public key and the latter is a private key; 2) the trusted hardware signature public-private key pair ($\widetilde{pk}^{\mathrm{TEE}}$, $\widetilde{sk}^{\mathrm{TEE}}$). The former is a public key and the latter is a private key.

When an initiator and a responder have a transaction for the first time, they should use the attestation technology attached to their trusted hardware to verify that the initiator and the responder are using reliable trusted hardware, and the responder obtains the trusted hardware signature public key $\widetilde{pk}_A^{\mathrm{TEE}}$ and the trusted hardware encryption public key $\widehat{pk}_A^{\mathrm{TEE}}$ of the initiator and saves it in the software system of the responder, and the initiator obtains the trusted hardware signature public key $\widetilde{pk}_B^{\mathrm{TEE}}$ and the trusted hardware encryption public key $\widetilde{pk}_B^{\mathrm{TEE}}$ of the responder and saves it in the software system of the initiator.

The trusted hardware can be implemented by a hardware security module (HSM) or a trusted execution environment (TEE), and its specific implementation includes but is not limited to Intel SGX, ARM TrustZone and other popular TEE or HSM solutions.

It should be noted that the trusted hardware provides a confidential storage function, which can save, read, update and delete confidential contents into a confidential storage space. Its implementation methods include but are not limited to storing confidential contents in a storage chip in the trusted hardware, encrypting the confidential contents with an encryption key built in the trusted hardware and storing the encrypted ciphertext in a storage space outside the trusted hardware. After being written, the confidential content cannot be read, modified or deleted by any device, user, system or software in any way, and after being deleted, it cannot be recovered and read by any device, user, system or software in any way.

The process of randomly generating a public-private key pair refers to randomly generating a public-private key pair based on digital signature solutions of asymmetric encryption, including but not limited to RSA, ECDSA, Schnorr and SM-2.

The process of generating a signature refers to the process of generating a digital signature for a signature content by using a signature algorithm based on asymmetric encryption corresponding to a private key after inputting the private key and the signature content.

(2) The software system of the initiator calculates a digital currency address addr through the public key $$pk_A^{TEE},$$

and deposits a digital currency into the digital currency address through a blockchain; the software system of the initiator sending the public key $$pk_A^{TEE},$$

a type of the digital currency, an initiator rescue address $addr_A$ preset by the initiator and an earliest rescue time $t_A$ expected by the initiator to the trusted hardware system of the initiator, requests the hardware system of the initiator to generate a rescue object for $$(pk_A^{TEE}, sk_A^{TEE}),$$

and so that after the trusted hardware system of the initiator crashes, is damaged or lost, the initiator can use the rescue object to retrieve the digital currency deposited at addr to the rescue address $addr_A$ of the initiator.

The blockchain is a blockchain system corresponding to the digital currency; the digital currency address is calculated by the software system of the initiator according to the public key $$pk_A^{TEE}$$

according to the method specified by the digital currency; this step creates a blockchain account managed by the trusted hardware system by transferring money to the digital currency address corresponding to the public key in the public-private key pair stored and managed by the trusted hardware system, and because the account is managed by the trusted system, users cannot achieve double spend attacks or other malicious behaviors no matter what operations they do, thus ensuring the transaction security.

It should be noted that it is common knowledge in this field that there is a blockchain system for the digital currency, and the digital currency address can be calculated according to the public key according to the method specified by the digital currency, which will not be repeated here.

After depositing the digital currency, the initiator can input, through its software system, the public key $$pk_A^{TEE},$$

the digital currency type and the initiator rescue address $addr_A$ present by the initiator, and the earliest rescue time $t_A$ expected by the initiator to its trusted hardware system, and requests its trusted hardware system to generate a rescue object for $$(pk_A^{TEE}, sk_A^{TEE}),$$

so that when the initiator's trusted hardware system crashes, is damaged or lost, the initiator can use the rescue object to retrieve the digital currency deposited at addr to the rescue address $addr_A$ of the initiator's after the earliest rescue time $t_A$.

After receiving the above parameters, the trusted hardware system of the initiator verifies whether $$pk_A^{TEE}$$

is marked as "rescue object has been generated" in the confidential storage space. If so, it returns the "rescue object has been generated" to the software system of the initiator; if not, according to the digital currency types, it is classified as a digital currency (such as Bitcoin) that supports deferred transactions, a digital currency (such as Ethereum) that does not support deferred transactions but supports smart contracts, and a digital currency that neither supports deferred transactions nor smart contracts, and corresponding rescue objects can be generated.

For digital currency, including but not limited to Bitcoin, which supports deferred transactions, the trusted hardware system of the initiator generates a transaction $tx_A$ that a $$sk_A^{TEE}$$

signature, the nTimeLock field being the above earliest rescue time $t_A$ expected by the initiator, the SIGHASH flag bit being SIGHASH_ALL, and transferring from addr to $addr_A$, and the transaction $tx_A$ is returned to the software system of the initiator as the rescue object. The advantages of this step are as follows: by generating $tx_A$, it is ensured that the prayer can retrieve the digital currency deposited at addr d to $addr_A$ by using $tx_A$ when it loses its trusted hardware system or its trusted hardware system crashes or is damaged. By setting the nTimeLock field to $t_A$, it is ensured that $tx_A$ can only be executed after $t_A$. By setting the SIGHASH position to SIGHASH_ALL, it is ensured that the earliest executable time of $tx_A$ cannot be modified by any one by modifying the nTimeLock field in $tx_A$.

For digital currency, including but not limited to Ethereum, which does not support deferred transactions but supports smart contracts, the trusted hardware system of the initiator generates a called transaction $call_A$ that calls a deferred transfer function of a smart contract that supports deferred transactions to realize transferring from addr to $addr_A$ and has an earliest executable time of $t_A$, and the transaction $call_A$ is returned to the software system of the initiator as a rescue object. Smart contracts supporting deferred transactions include but are not limited to smart contracts that use any method to realize deferred transfer, such as https://github.com/chatch/hashed-timelock-contract-ethereum or https://github.com/pawurb/Locker or https://github.com/GOOGZHOU/htlc-lc-eth or other implementation methods. The advantage of this step is that the initiator can use $call_A$ to retrieve the digital currency deposited at addr to $addr_A$ when it loses its trusted hardware system or its trusted hardware system crashes or is damaged, and the earliest executable time parameter for calling the deferred transfer function in $call_A$ is set to be $t_A$ to ensure that $call_A$ can be executed only after $t_A$.

For digital currency, which does not support deferred transactions nor smart contracts, the trusted hardware system of the initiator obtains the current time $t_{now}$ through a trusted clock or trusted timing point, and generates a time lock puzzle $puzzle_A$ with a secret being a blockchain transaction that immediately transfers the digital currency at addr to $addr_A$, a computing performance being a current computing performance constant and an unlocking duration being $t-t_{now}$ through a generation algorithm in time lock puzzle algorithms (including but not limited to RSW time lock puzzle algorithms) and returns the time lock puzzle $puzzle_A$ to the software system of the initiator as the rescue object. The advantage of this step is that by generating $puzzle_A$, it is guaranteed that the initiator can use the decryption algorithm of the corresponding time lock puzzle algorithm to solve the blockchain transaction that immediately transfers the digital currency at addr to $addr_A$ when its trusted hardware system is lost or its trusted hardware system crashes or is damaged, and after the blockchain transaction is submitted to the blockchain, the digital currency at addr can be retrieved to addr. In addition, by setting a unlocking duration to $t-t_{now}$ in the process of generating $puzzle_A$, it is ensured that the initiator can only solve $sk_A^{TEE}$ from puzzle$_A$ at a time before or after $t_A$ within a certain error time, thus ensuring that the initiator can only retrieve the digital currency deposited at addr at the time before or after $t_A$ within a certain error time.

It should be noted that because the core idea of the time-locked puzzle algorithm is to create a computing task, the time required for its solution is predictable. However, there are errors in this algorithm for two main reasons: first, the time required for different hardware to perform the same computing task may be different, and the high-performance processor may complete the task faster than the low-performance processor, resulting in the difference in computing time; secondly, with the development of technology, the performance of a new generation of processors is constantly improving, which shortens the time required for the originally designed computing tasks. These factors lead to a certain error range in the time prediction of the time lock puzzle algorithm in practical application. This error range may range from a few seconds to several minutes, depending on the performance difference of the hardware used and the speed of technological progress.

After the rescue object is generated, the trusted hardware system of the initiator marks $pk_A^{TEE}$ as "the rescue object has been generated" in the confidential storage space, uses $\widetilde{sk}_A^{TEE}$ to sign the earliest rescue time $t_A$ expected by the initiator to generate a signature $\sigma_{t_A}$, and returns the rescue object, the rescue time $t_A$ and the signature $\sigma_{t_A}$ to the software system of the initiator, so that the initiator can derive the rescue object from its software system and save it to any location.

In an embodiment, after saving the rescue object, if the initiator loses its trusted hardware system or its trusted hardware system crashes or is damaged, it can use the rescue object to retrieve the digital currency at addr. Depending on the type of digital currency, the initiator needs to retrieve it back in different ways:

For a digital currency, including but not limited to Bitcoin, that supports deferred transactions, after submitting the earliest rescue time $t_A$ expected by the initiator, the initiator submits tx$_A$ to a blockchain system through the software system thereof or any blockchain client supporting the digital currency, and retrieves the digital currency deposited at addr to the rescue address addr$_A$ after confirmation by the blockchain system.

For a digital currency, including but not limited to Ethereum, that does not support deferred transactions but supports smart contracts, after submitting the earliest rescue time $t_A$ expected by the initiator, the initiator submits call$_A$ to the blockchain system through the software system thereof or any blockchain client that supports the digital currency, and retrieves the digital currency deposited at addr to the rescue address addr$_A$ after confirmation by the blockchain system.

For a digital currency that does not support deferred transactions nor smart contracts, the initiator immediately starts to execute a decryption algorithm of the corresponding time lock puzzle algorithm after obtaining puzzle$_A$, and the initiator solves puzzle$_A$ to obtain $sk_A^{TEE}$ before and after the earliest rescue time $t_A$ expected by the initiator, generates a transaction of transferring from addr to the personal digital currency address of the initiator with the software system, and submits the transaction to the blockchain to retrieve the digital currency.

(3) A trusted hardware system of a responder randomly generates a public-private key pair $(pk_B^{TEE}, sk_B^{TEE})$, generates a signature $\sigma_B$ for a public key $pk_B^{TEE}$ by using its own signature private key $\widetilde{sk}_B^{TEE}$, and returns the public key $pk_B^{TEE}$ and the signature $\sigma_B$ to the software system of the responder.

This step generates a public-private key pair stored and controlled by trusted hardware through the trusted hardware system, which makes it possible to create a secure blockchain account controlled and managed by trusted hardware in the following steps. In this step, the trusted hardware system of the responder saves the public-private key pair v as confidential content in a confidential storage space, including directly storing it in the trusted hardware or encrypting it by the trusted hardware with a key that will not leak and storing it in a specific area, and the private key cannot be read by any device, system, software or user except the trusted hardware system in any way.

(4) The software system of the responder calculates a digital currency address addr' through the public key $pk_B^{TEE}$, and deposits a digital currency into the digital currency address through a blockchain. The blockchain is a blockchain system corresponding to the digital currency; the digital currency address is calculated by the software system of the responder according to the public key $pk_B^{TEE}$ according to the method specified by the digital currency.

This step creates a blockchain account managed by the trusted hardware system by transferring money to the digital currency address corresponding to the public key in the public-private key pair stored and managed by the trusted hardware system, and because the account is managed by the trusted system, users cannot achieve double spend attacks or other malicious behaviors no matter what operations they do, thus ensuring the transaction security.

The software system of the responder sends the public key $$pk_B^{TEE},$$

a type of the digital currency, an responder rescue address $addr_B$ preset by the responder, and an earliest rescue time $t_B$ expected by the responder to the trusted hardware system of the responder, requesting the rusted hardware system of the responder to generate a rescue object for $$(pk_B^{TEE}, sk_B^{TEE}),$$

so that the responder can use the rescue object to retrieve the digital currency deposited at addr' to the responder's rescue address $addr_B$ after $t_B$ when the trusted hardware system of the responder crashes, is damaged or lost. The blockchain is a blockchain system corresponding to the digital currency; the digital currency address is calculated by the software system of the responder according to the public key $$pk_B^{TEE}$$

according to the method specified by the digital currency.

After depositing the digital currency, the responder can input, through its software system, the public key $$pk_B^{TEE},$$

digital currency type and responder rescue address $addr_B$ present by the responder, and the earliest rescue time $t_B$ expected by the responder to its trusted hardware system, and requests its trusted hardware system to generate a rescue object for $$(pk_B^{TEE}, sk_B^{TEE}),$$

so that when the responder's trusted hardware system crashes, is damaged or lost, the responder can use the rescue object to retrieve the existing digital currency deposited at addr' to the responder's rescue address addr after the earliest rescue time $t_B$.

After receiving the above parameters, the trusted hardware system of the responder verifies whether $$pk_B^{TEE}$$

is marked as "rescue object has been generated" in the confidential storage space. If so, it returns the "rescue object has been generated" to the software system of the responder; if not, according to the digital currency types, it is classified as digital currency (such as Bitcoin) that supports deferred transactions, digital currency (such as Ethereum) that does not support deferred transactions but supports smart contracts, and digital currency that neither supports deferred transactions nor smart contracts, and corresponding rescue objects can be generated.

For digital currency, including but not limited to Bitcoin, which supports deferred transactions, the trusted hardware system of the responder generates a transaction $tx_B$ that uses a $$sk_B^{TEE}$$

signature, the nTimeLock field being the above earliest rescue time $t_B$ expected by the responder, the SIGHASH flag bit being SIGHASH_ALL, and transferring from addr to $addr_B$, and the transaction $tx_B$ is returned to the software system of the responder as the rescue object. The advantages of this step are as follows: by generating $tx_{R'}$ it is ensured that the responder can retrieve the digital currency deposited at addr' d to $addr_B$ by using $tx_B$ when it loses its trusted hardware system or its trusted hardware system crashes or is damaged; by setting the nTimeLock field to $t_B$, it is ensured that $tx_B$ can only be executed after $t_B$; and by setting the SIGHASH position to SIGHASH_ALL, it is ensured that the earliest executable time of $tx_B$ cannot be modified by any one by modifying the nTimeLock field in $tx_B$.

For digital currency, including but not limited to Ethereum, which does not support deferred transactions but supports smart contracts, the trusted hardware system of the responder generates a deferred transfer function to call the smart contracts that support deferred transactions, so as to realize a called transaction $call_B$ of transferring from addr' to $addr_B$ with earliest executable time being $t_B$, and the transaction $call_B$ is returned to the software system of the responder as a rescue object. Smart contracts supporting deferred transactions include but are not limited to smart contracts that use any method to realize deferred transfer, such as https://github.com/chatch/hashed-timelock-contract-ethereum or https://github.com/pawurb/Locker or https://github.com/GOOGZHOU/htlc-lc-eth or other implementation methods. The advantage of this step is that the responder can use $call_B$ to retrieve the digital currency deposited at addr to $addr_B$ when it loses its trusted hardware system or its trusted hardware system crashes or is damaged, and the earliest executable time parameter for calling the deferred transfer function in $call_B$ is set to be $t_B$ to ensure that $call_B$ can be executed only after $t_B$.

For digital currency, which does not support deferred transactions nor smart contracts, the trusted hardware system of the responder obtains the current time $t_{now}$, through a trusted clock or trusted timing point, and generates a time lock puzzle $puzzle_B$ with a secret being a blockchain transaction that immediately transfers the digital currency at addr' to $addr_B$, a computing performance being a current computing performance constant and an unlocking duration being $t_B - t_{now}$, through a generation algorithm in time lock puzzle algorithms (including but not limited to RSW time lock puzzle algorithms) and returns the time lock puzzle to the software system of the responder as the rescue object. The advantage of this step is that by generating $puzzle_B$, it is guaranteed that the responder can use the decryption algorithm of the corresponding time lock puzzle algorithm to solve the above blockchain transaction that immediately transfers the digital currency at addr' to $addr_A$ when its trusted hardware system is lost or its trusted hardware system crashes or is damaged, and after the blockchain transaction is submitted to the blockchain, the responder can retrieve the digital currency at addr' to $addr_B$. In addition, by setting a unlocking duration to $t_B - t_{now}$, in the process of generating $puzzle_B$, it is ensured that the responder can only solve $$sk_B^{TEE}$$

from $puzzle_B$ at a time before or after $t_B$ within a certain error time, thus ensuring that the responder can only retrieve the digital currency deposited at addr' at the time before or after $t_B$ within a certain error time.

After the rescue object is generated, the trusted hardware system of the responder marks $$pk_B^{TEE}$$

as "the rescue object has been generated" in the confidential storage space, uses $\widetilde{sk}_B^{TEE}$ to sign the earliest rescue time $t_B$ expected by the responder to generate a signature $\sigma_{t_B}$, and returns the rescue object, and the signature $\sigma_{t_B}$ to the software system of the responder, so that the responder can derive the rescue object from its software system and save it to any location.

In an embodiment, after saving the rescue object, if the responder loses its trusted hardware system or its trusted hardware system crashes or is damaged, it can use the rescue object to retrieve the digital currency at addr'. Depending on the type of digital currency, the responder needs to retrieve it back in different ways:

For a digital currency, including but not limited to Bitcoin, that supports deferred transactions, after submitting the earliest rescue time $t_B$ expected by the responder, the responder submits $tx_B$ to a blockchain system through the software system thereof or any blockchain client supporting the digital currency, and retrieves the digital currency deposited at addr' to the rescue address $addr_B$ after confirmation by the blockchain system.

For a digital currency, including but not limited to Ethereum, that does not support deferred transactions but supports smart contracts, after submitting the earliest rescue time $t_B$ expected by the responder, the responder submits $call_B$ to the blockchain system through the software system thereof or any blockchain client that supports the digital currency, and retrieves the digital currency deposited at addr' to the rescue address $addr_B$ after confirmation by the blockchain system.

For a digital currency that does not support deferred transactions or smart contracts, the responder immediately starts to execute a decryption algorithm of the corresponding time lock puzzle algorithm after obtaining $puzzle_B$, and the responder solves $puzzle_B$ to obtain $$sk_B^{TEE}$$

before and after the earliest rescue time $t_B$ expected by the responder, generates a transaction of transferring from addr' to the personal digital currency address of the responder with the software system, and submits the transaction to the blockchain to retrieve the digital currency.

(5) The software system of the initiator sends the digital currency address addr and the earliest rescue time $t_A$ expected by the initiator to the software system of the responder, and the software system of the responder verifies whether there is a corresponding digital currency at addr and confirms whether to accept the earliest rescue time $t_A$ expected by the initiator; if the responder does not accept the earliest rescue time $t_A$ expected by the initiator, the transaction is terminated, otherwise, it is determined whether $t_B - t_A$ is greater than two fixed time intervals, if not, the transaction is terminated, and if so, the software system of the responder sends a trusted hardware signature public key $\widetilde{pk}_B^{TEE}$ of the responder and a trusted hardware encryption public key $\widehat{pk}_B^{TEE}$ of the responder to the software system of the initiator.

The advantage of this step is that the responder can confirm that the swap can meet the requirements of the responder by observing whether the blockchain account with the address of addr and managed by the trusted hardware system on the blockchain meets the requirements of the responder and determining whether the earliest rescue time $t_A$ expected by the initiator meets the requirements of the responder, and can confirm whether the swap meets the safety requirements of the swap method by determining whether $t_B - t_A$ is more than two fixed time intervals, thus ensuring the security of the swap transaction.

It should be noted that the fixed time interval is calculated according to the upper limit of the time that the blockchain conflict transaction may be blocked, usually in ten minutes.

In this step, the responder can browse whether there is the asserted digital currency under the addr address/account on the blockchain system through the built-in blockchain browser or other blockchain browsers or any method.

In this step, if there has been no prior transaction between the initiator and the responder, the initiator should call the trusted hardware attestation technology through its software system to verify whether the trusted hardware system of the responder is running on reliable trusted hardware. If the verification is passed, the trusted hardware signature public key $\widetilde{pk}_B^{TEE}$ of the responder and the trusted hardware encryption public key $\widehat{pk}_B^{TEE}$ of the responder are obtained and stored in the software system of the initiator.

(6) The software system of the responder sends the digital currency address addr' and the earliest rescue time $t_B$ expected by the responder to the software system of the initiator, and the software system of the initiator verifies whether there is a corresponding digital currency at addr' and confirms whether to accept the earliest rescue time $t_B$ expected by the responder; if the initiator does not accept the earliest rescue time $t_B$ expected by the responder, the transaction is terminated, otherwise, it is determined whether $t_B - t_A$ is greater than two fixed time intervals, if not, the transaction is terminated, and if so, the software system of the initiator sends a trusted hardware signature public key $\widetilde{pk}_A^{TEE}$ of the initiator and a trusted hardware encryption public $\widehat{pk}_A^{TEE}$ of the initiator to the software system of the responder.

The advantage of this step is that the initiator can confirm that the swap can meet the requirements of the initiator by observing whether the blockchain account with the address addr' of and managed by the trusted hardware system on the blockchain meets the requirements of the initiator and determining whether the earliest rescue time $t_B$ expected by the responder meets the requirements of the initiator, and can confirm whether the swap meets the safety requirements of the swap method by determining whether $t_B-t_A$ is more than two fixed time intervals, thus ensuring the security of the swap transaction. After the verification, the trusted hardware system of the initiator uses its software system to send the trusted hardware encryption public key $\widehat{pk}_A^{TEE}$ of the initiator and the trusted hardware signature public key $\widetilde{pk}_A^{TEE}$ of the initiator to the software system of the responder.

In this step, the initiator can browse whether there is the asserted digital currency under the addr' address/account on the blockchain system through the built-in blockchain browser or other blockchain browsers or any method.

In this step, if there has been no prior transaction between the responder and the initiator, the responder should call the trusted hardware attestation technology through its software system to verify whether the trusted hardware system of the initiator is running on reliable trusted hardware. If it passes the verification, the initiator's trusted hardware signature public key $\widetilde{pk}_A^{TEE}$ and the initiator's trusted hardware encryption public key $\widehat{pk}_A^{TEE}$ are obtained and stored in the responder's software system.

(7) The software system of the initiator sends the public key $$pk_A^{TEE},$$

the trusted hardware encryption public key $\widehat{pk}_B^{TEE}$ of the responder, and a rescue address $addr_{A'}$ preset by the initiator located in a same blockchain system as the digital currency address addr' to the trusted hardware system of the initiator, and requests the trusted hardware system of the initiator to transfer $$(pk_A^{TEE}, sk_A^{TEE}).$$

The trusted hardware system of the initiator uses $\widehat{pk}_B^{TEE}$ to perform asymmetric encryption on $$sk_A^{TEE}$$

to generate a ciphertext $C_A$, deleting $$(pk_A^{TEE}, sk_A^{TEE})$$

from a confidential storage space, and uses the trusted hardware signature private key $\widetilde{sk}_A^{TEE}$ thereof to sign $C_A$ and $addr_{A'}$ respectively to generate signatures $\sigma_{C_A}$ and $\sigma addr_{A'}$, and sending $C_A$, $\sigma_{C_A}$, $\sigma_{addr_{A'}}$ to the software system of the initiator.

When the trusted hardware system of the initiator deletes the private key $$sk_A^{TEE}$$

from the confidential storage space, no system, equipment, software or user can obtain the private key again. This step completes the transfer of digital currency assets by transferring $$(pk_A^{TEE}, sk_A^{TEE}),$$

which avoids complex, time-consuming and expensive on-chain transactions and realizes fast, free and safe off-chain transactions. Moreover, because the transfer of $$(pk_A^{TEE}, sk_A^{TEE})$$

is decoupled from the specific blockchain system, the transaction across different blockchains is naturally realized. In this step, the asymmetric encryption includes directly encrypting the input public key and the original text with an encryption algorithm including but not limited to RSA, SM-2 and other asymmetric encryption solutions to obtain the ciphertext, and it further includes encrypting the input public key and the original text with the encryption algorithm of a hybrid encryption solution, that is, a one-time key is randomly generated, the input one-time key and the original text use symmetric encryption algorithms including but not limited to AES, DES, SM-1 to generate a symmetric encrypted ciphertext, and the input public key and the one-time key use asymmetric encryption algorithms including but not limited to RSA and SM-2 to generate an asymmetric encrypted ciphertext.

(8) The software system of the initiator sends the public key $$pk_A^{TEE},$$

the signature $\sigma_A$, the ciphertext $C_A$, the signature $\sigma_{C_A}$, the earliest rescue time $t_A$ expected by the initiator, signature, the rescue address $addr_{A'}$ of the initiator and the signature $\sigma_{addr_{A'}}$ to the software system of the responder.

After this step, if the initiator does not receive a reply from the responder after waiting for any period of time and guesses that the responder is a malicious party, the initiator can use the rescue object obtained in step (2) and use the corresponding rescue method to retrieve the digital currency at addr after $t_A$ and terminate the swap.

If the initiator finds out, through a blockchain browser built in the software thereof or other blockchain browsers or any method, that the digital currency at addr is taken out before $t_A$, it can be determined that the responder uses the special rescue object for retrieval. The above-mentioned special rescue objects will be introduced in detail in step (9). The initiator extracts, through the blockchain browser built in the software thereof or other blockchain browsers or any method, $tx_{R'}$ from the payload of the transaction of the digital currency taken out from addr, and submits $tx_{R'}$ to the blockchain, and transfers the digital currency at addr' to the rescue address $addr_A$ preset by the initiator to complete the swap.

It shall be noted that using the blockchain browser to view blockchain transactions and extract payload from blockchain transactions are common knowledge in this field and will not be described here.

(9) The software system of the responder sends the public key $$pk_A^{TEE},$$

the signature $\sigma_A$, the ciphertext $C_A$, the signature $\sigma_{C_A}$, the earliest rescue time $t_A$ expected by the initiator, signature, the rescue address $addr_{A'}$ of the initiator, the signature $\sigma_{addr_{A'}}$, the trusted hardware signature public key $\widetilde{pk}_A^{TEE}$ of the initiator, the trusted hardware encryption public key $\widehat{pk}_A^{TEE}$ of the initiator, the public key $$pk_B^{TEE},$$

the earliest rescue time $t_B$ expected by the responder, the signature $\sigma_{t_B}$, and a rescue address $addr_{B'}$ preset by the responder located in a same blockchain system as the digital currency address addr to the trusted hardware of the responder; the trusted hardware system uses $\widetilde{pk}_A^{TEE}$ to verify whether $\sigma_A$ is a signature for $$pk_A^{TEE}$$

by the trusted hardware system of the initiator using $\widetilde{sk}_A^{TEE}$, whether $\sigma_{C_A}$ is a signature for $C_A$ by the trusted hardware system of the initiator using $\widetilde{sk}_A^{TEE}$, whether $\sigma_{t_A}$ is a signature for $t_A$ by the trusted hardware system of the initiator using $\widetilde{sk}_A^{TEE}$, whether $\sigma addr_{A'}$ is a signature for $addr_{A'}$ by the trusted hardware system of the initiator using $\widetilde{sk}_A^{TEE}$, and uses $\widetilde{pk}_B^{TEE}$ to verify whether $\sigma_{t_B}$ is signature for $t_B$ by the trusted hardware system of the responder using $\widetilde{sk}_B^{TEE}$. If the verify is passed, whether $t_B-t_A$ is greater than two fixed time intervals is verified, and if the verify is further passed, $\widehat{sk}_B^{TEE}$ is used to perform asymmetric decryption on $C_A$ to obtain $$sk_A^{TEE}, \left(pk_A^{TEE}, sk_A^{TEE}\right)$$

is stored, and the public-private key pair is set to a locked state. At the same time, the trusted hardware system of the respondent deletes $$sk_B^{TEE}$$

from its confidential storage space. When the trusted hardware system of the initiator deletes the private $$sk_B^{TEE}$$

from the confidential storage space, no system, equipment, software or user can obtain the private key again. The above operation of setting the public-private key pair to the locked state means that the trusted hardware system of the responder does not allow the responder or any user to transfer the locked public-private key pair before completing this exchange. Moreover, the trusted hardware system of the responder uses $\widehat{pk}_A^{TEE}$ to perform asymmetric encryption on $$sk_B^{TEE}$$

to generate a ciphertext $C_B$, and uses the trusted hardware signature private key thereof $\widetilde{sk}_B^{TEE}$ to sign $C_B$ and generate a signature $\sigma_{C_B}$. Then, the trusted hardware of the responder generates a blockchain transaction $tx_{R'}$ of immediately transferring from addr' to $addr_{A'}$ which conforms to the digital currency type of addr's. Moreover, according to the digital currency type of addr, the trusted hardware of the responder can classify it into three categories: digital currency (such as Bitcoin) that supports deferred transactions, digital currency (such as Ethereum) that does not support deferred transactions but supports smart contracts, and digital currency that neither supports deferred transactions nor smart contracts, and depending on its category, the trusted hardware of the responder generates a special rescue object, for $$\left(pk_A^{TEE}, sk_A^{TEE}\right),$$

with an expected rescue time being a time $t'_A$ that is earlier than $t_A$ by at least a fixed time interval, with a rescue address being $addr_{B'}$, with a payload being $tx_{R''}$. As the methods of generating rescue objects for digital currency that supports deferred transactions, digital currency that does not support deferred transactions but supports smart contracts, and digital currency that neither supports deferred transactions nor smart contracts have been described in steps (2) and (4), they are not repeated here.

After the above operations are completed, the trusted hardware system of the responder will return $C_B$, $\sigma_{C_B}$ and the special rescue object to the software system of the responder.

The advantage of this step is that after completing this step, the trusted hardware system of the responder ensures that the responder cannot get $$sk_A^{TEE} \text{ and } sk_B^{TEE}$$

at the same time in this swap, that is, it can't get the digital currency at addr and addr' at the same time, thus ensuring the security of this swap.

In this step, the process of verifying the signature refers to the process of inputting the public key, signature and signature content, and then verifying whether the input signature is generated by signing the signature content with the private key corresponding to the input public key by using the verification algorithm of the digital signature solution based on asymmetric encryption.

In this step, the asymmetric decryption not only includes that the input private key and the original text directly decrypt the ciphertext to obtain the original text by a decryption algorithm including but not limited to RSA, SM-2 and other asymmetric encryption solutions, but further includes that the input private key, symmetrically encrypted ciphertext and asymmetrically encrypted ciphertext are decrypted by the decryption algorithm of a hybrid encryption solution, that is, the input private key and asymmetrically encrypted ciphertext use the decryption algorithm including but not limited to AES, DES, SM-1 and other symmetric encryption solutions to obtain the one-time key, and the input one-time key and symmetrically encrypted ciphertext use the decryption algorithm including but not limited to RSA, SM-2 and other asymmetric encryption solutions to obtain the original text.

(10) The software system of the responder sends the public key $$pk_B^{TEE},$$

the signature $\sigma_B$, the ciphertext $C_B$, the signature $\sigma_{C_B}$, the earliest rescue time $t_B$ expected by the responder and the signature $\sigma_{t_B}$ to the software system of the initiator.

After this step, if the responder does not receive a reply from the responder after waiting for any period of time, and guesses that the initiator is a malicious party, the responder can use the corresponding rescue method to submit the special rescue object obtained in step (9) to the digital currency system where addr is located, transfer the digital currency at addr to addr, and terminate the swap.

(11) The software system of the initiator sends the public key $$pk_B^{TEE},$$

the signature $\sigma_B$, the ciphertext $C_B$, the signature $\sigma_{C_B}$, the earliest rescue time $t_B$ expected by the responder and the signature $\sigma_{t_B}$, the trusted hardware signature public key $\widetilde{pk}_B^{TEE}$ of the responder, the earliest rescue time $t_A$ expected by the initiator and the signature $\sigma_{t_A}$ to the trusted hardware system of the initiator, the trusted hardware system of the initiator using $\widetilde{pk}_B^{TEE}$ to verify whether $\sigma_B$ is a signature for $$pk_B^{TEE}$$

by the trusted hardware system of the responder using $\widetilde{sk}_B^{TEE}$, whether $\sigma_{C_B}$ is a signature for $C_B$ by the trusted hardware system of the responder using $\widetilde{sk}_B^{TEE}$, whether $\sigma_{t_B}$ is a signature for $t_B$ by the trusted hardware system of the responder using $\widetilde{sk}_B^{TEE}$, and using $\widetilde{pk}_A^{TEE}$ to verify whether $\sigma_{t_A}$ is a signature for $t_A$ by the trusted hardware system of the initiator using $\widetilde{sk}_A^{TEE}$; if the verify is passed, whether $t_B - t_A$ is greater than two fixed time intervals is verified, and if the verify is further passed, $\widetilde{sk}_A^{TEE}$ is used to perform asymmetric decryption on $C_B$ to obtain $$sk_B^{TEE}, (pk_B^{TEE}, sk_B^{TEE})$$

is stored into the confidential storage space thereof, and $\widetilde{sk}_A^{TEE}$ is used to sign $$pk_B^{TEE}$$

to generate a signature $\sigma_{B'}$, $\widetilde{pk}_A^{TEE}$ is used to perform asymmetric encryption on a completion symbol to generate a ciphertext $C'_A$, $\widetilde{sk}_A^{TEE}$ is used to sign $C'_A$ to generate a signature $\sigma_{C'_A}$, and $\sigma_{B'}$, $C'_A$, $\sigma_{C'_A}$ are returned to the software system of the initiator. The completion symbol can be a constant value or a string defined in the system in advance.

(12) The software system of the initiator sends the ciphertext $C'_A$ and the signature $\sigma_{C'_A}$ to the software system of the responder.

After this step, the initiator part of this swap has been completed. After completing this step, the initiator can reuse $$(pk_B^{TEE}, sk_B^{TEE})$$

for off-chain swap in other scenarios, so as to realize rapid digital currency asset swap without chain cost. If the initiator needs to swap the digital currency in the digital currency account/address addr' corresponding to $$pk_B^{TEE},$$

steps (14) and (15) can be executed

(13) After receiving the ciphertext $C'_A$ and signature $\sigma_{C'_A}$, the software system of the responder sends the ciphertext $C'_A$, the signature $\sigma_{C'_A}$ and the trusted hardware signature public key $\widetilde{pk}_A^{TEE}$ of the initiator to the trusted hardware system thereof; the trusted hardware system of the responder using $\widetilde{pk}_A^{TEE}$ to verify whether $\sigma_{C'_A}$ is a signature for $C'_A$ by the trusted hardware system of the initiator using $\widetilde{sk}_A^{TEE}$; if the verify is passed, $\widetilde{sk}_B^{TEE}$ is used to perform asymmetric decryption on $C'_A$; if the ciphertext is decrypted to obtain the completion symbol, the locked state of $$(pk_A^{TEE}, sk_A^{TEE})$$

is removed, and $\widetilde{pk}_B^{TEE}$ is used to sign $$pk_A^{TEE}$$

to generate a signature $\sigma_{A'}$, and $\sigma_{A'}$ is returned to the software system of the responder.

After this step, the responder part of this swap has been completed. After completing this step, the responder can reuse $$\left(pk_A^{TEE}, sk_A^{TEE}\right)$$

for off-chain swap in other scenarios, so as to realize rapid digital currency asset swap without chain cost. If the initiator needs to withdraw the digital currency in the digital currency account/address addr' corresponding to $$pk_B^{TEE},$$

steps (16) and (17) can be executed.

After executing the above steps, the swap portion of the method for off-chain based on trusted hardware swap is finished.

Figure 3:
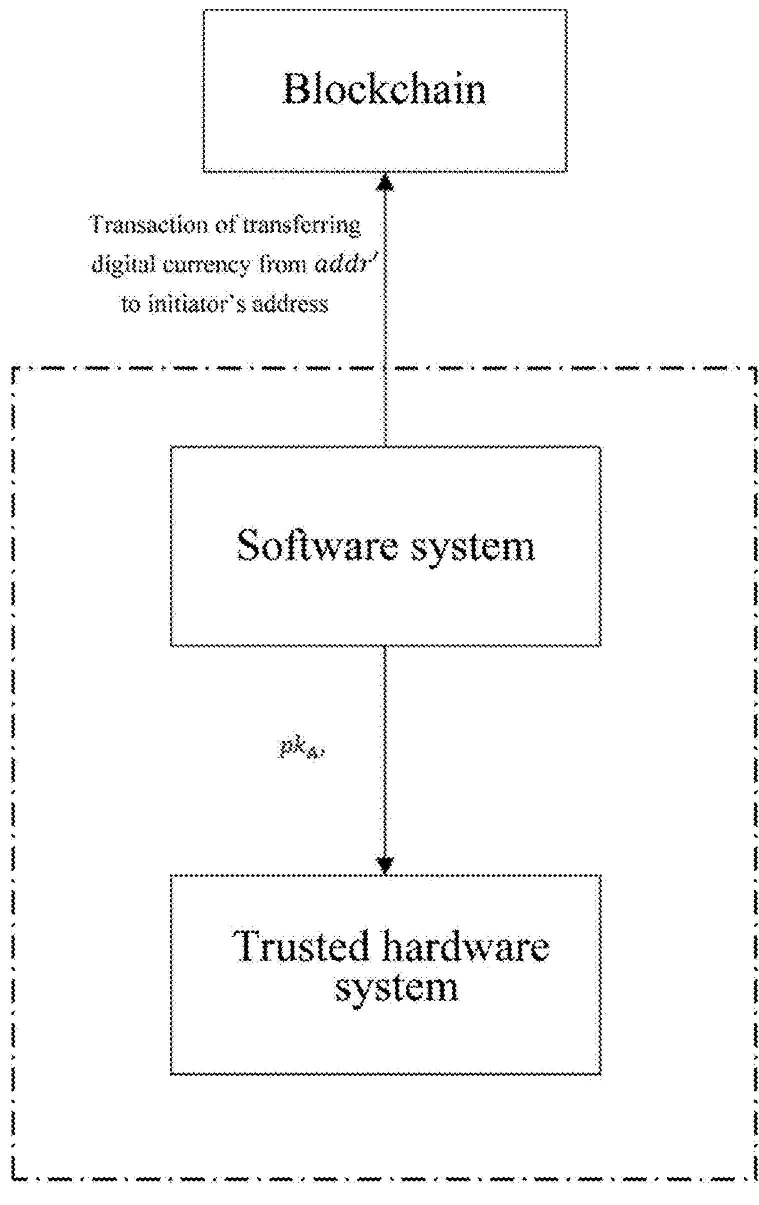
FIG. 3 is a schematic diagram of an initiator exchanging digital currency after the digital currency off-chain swap method based on trusted hardware according to an exemplary embodiment.

As shown in FIG. 3, if the initiator needs to withdraw the digital currency in the digital currency account/address addr' corresponding to $$pk_B^{TEE}$$

after executing step (12), the following will be executed.

(14) The initiator inputs a public key $pk_{A'}$ and the public key $$pk_B^{TEE}$$

to the trusted hardware system thereof through the software system of the initiator to request for transferring of $$\left(pk_B^{TEE}, sk_B^{TEE}\right),$$

and the trusted hardware thereof uses $pk_{A'}$ to perform asymmetric encryption on $$sk_B^{TEE}$$

to generate a ciphertext $C_{B'}$, deletes $$\left(pk_B^{TEE}, sk_B^{TEE}\right)$$

from the confidential storage space, uses the trusted hardware signature private key $\widetilde{sk}_A^{\mathrm{TEE}}$ to sign $C_{B'}$ to generate a signature $\sigma_{C_{B'}}$, and returns $C_{B'}$ and $\sigma_{C_{B'}}$ to the software system of the initiator. When the trusted hardware system of the initiator deletes the private key $$sk_B^{TEE}$$

in the confidential storage space, no user, software, system or equipment can obtain the private key again. The advantage of this step is that $$sk_B^{TEE}$$

is not stored in the trusted hardware of the initiator, and it is ensured that $$sk_B^{TEE}$$

cannot be double spent.

(15) The software system of the initiator uses $\widetilde{pk}_A^{\mathrm{TEE}}$ to verify whether $\sigma_{B'}$ is a signature for $$pk_B^{TEE}$$

by the trusted hardware system of the initiator using $\widetilde{sk}_A^{\mathrm{TEE}}$, and uses $\widetilde{pk}_A^{\mathrm{TEE}}$ to verify whether $\sigma_{C_{B'}}$ is the signature for $C_{B'}$ by the trusted hardware system of the initiator using $\widetilde{sk}_A^{\mathrm{TEE}}$; if the verify is passed, the corresponding private key $sk_{A'}$ of the public key $pk_{A'}$ provided in the above step (14) is used to decrypt the ciphertext $C_{B'}$ to obtain $$sk_B^{TEE},$$

and the software system of the initiator uses $$\left(pk_B^{TEE}, sk_B^{TEE}\right)$$

to generate a transaction of transferring from addr' to a personal digital currency address of the initiator, and submits the transaction to the blockchain for digital currency withdrawal.

Figure 4:
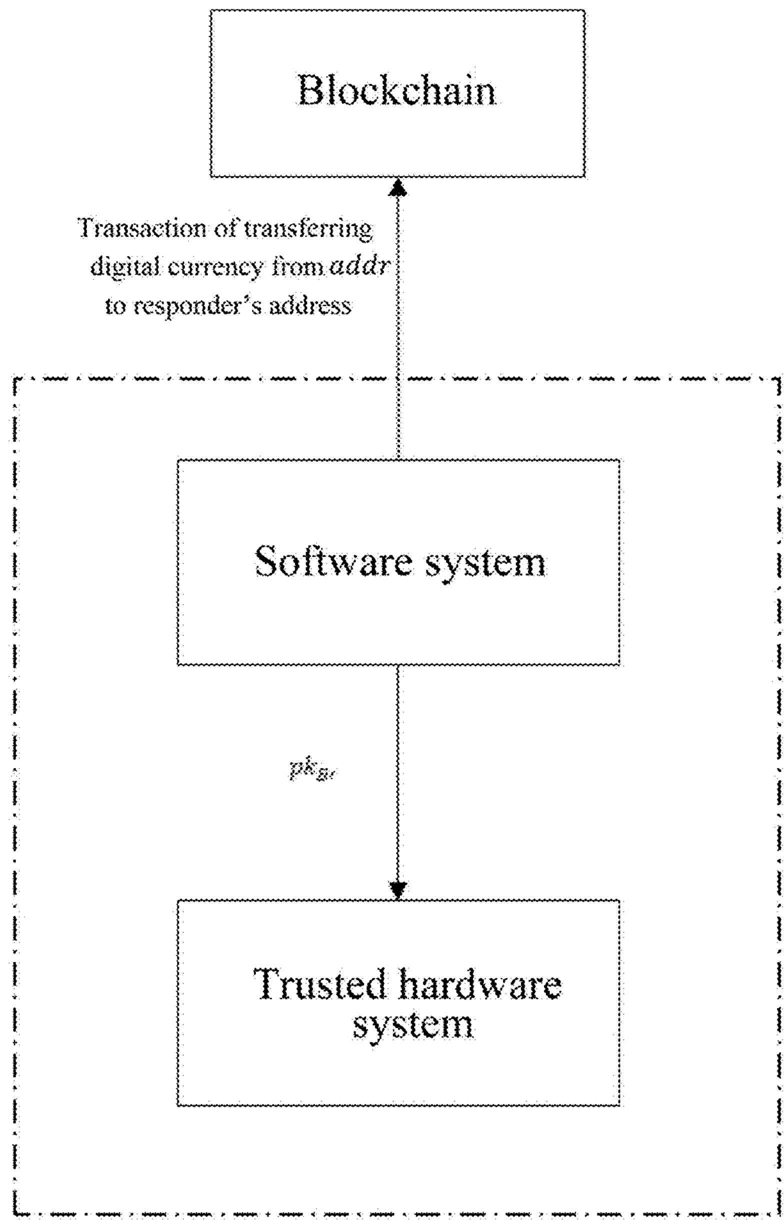
FIG. 4 is a schematic diagram of a responder exchanging digital currency after digital currency off-chain swap method based on trusted hardware according to an exemplary embodiment.

As shown in FIG. 4, if the responder needs to withdraw the digital currency in the digital currency account/address addr corresponding to $$pk_A^{TEE}$$

after executing step (13), it will be executed.

(16) The responder inputs a public key $pk_{B'}$ and the public key $$pk_A^{TEE}$$

to the trusted hardware system thereof through the software system of the responder to request for transferring of $$\left(pk_A^{TEE}, sk_A^{TEE}\right),$$

and the trusted hardware thereof uses $pk_{B'}$ to perform asymmetric encryption on $$sk_A^{TEE}$$

to generate a ciphertext $C_{A'}$, deletes $$(pk_A^{TEE}, sk_A^{TEE})$$

from the confidential storage space, uses the trusted hardware signature private key $\widetilde{sk}_B^{TEE}$ to sign $C_{A'}$ to generate a signature $\sigma_{C_{A'}}$ and returns $C_{A'}$ and $\sigma_{C_{A'}}$ to the software system of the responder. When the trusted hardware system of the responder deletes the private key sky $$sk_A^{TEE}$$

in the confidential storage space, no user, software, system or equipment can obtain the private key again. The advantage of this step is that $$sk_A^{TEE}$$

is not stored in the trusted hardware of the responder, and it is ensured that $$sk_A^{TEE}$$

cannot be double spent.

(17) The software system of the responder uses $\widetilde{pk}_B^{TEE}$ to verify whether $\sigma_A$, is a signature for $$pk_A^{TEE}$$

by the trusted hardware system of the responder using $\widetilde{sk}_B^{TEE}$, and uses $\widetilde{pk}_B^{TEE}$ to verify whether $\sigma_{C_{A'}}$ is the signature for $C_{A'}$ by the trusted hardware system of the responder using $\widetilde{sk}_B^{TEE}$; if the verify is passed, the corresponding private key $sk_{B'}$ of the public key $pk_{B'}$ is used to decrypt the ciphertext $C_{B'}$ to obtain $$sk_A^{TEE},$$

and the software system of the responder uses $$(pk_A^{TEE}, sk_A^{TEE})$$

to generate a transaction of transferring from addr to a personal digital currency address of the responder, and submits the transaction to the blockchain for digital currency withdrawal.

In the example of the present disclosure, by adopting the method for digital currency intra-chain and cross-chain off-chain swaps based on trusted hardware, the digital currency intra-chain and cross-chain off-chain swap system based on trusted hardware can be constructed, so that the functions of intra-chain and cross-chain off-chain swap in digital currency can be realized. According to the present disclosure, the public-private key pair saved and managed by the trusted hardware system and the fair exchange protocol in cryptography are created and transferred to replace the on-chain swap, so that the security of the swap is guaranteed by the trusted hardware and the fair exchange protocol, the complicated on-chain swap step is avoided, the long on-chain swap time is reduced, the high on-chain swap cost is avoided, and the differences among the blockchain systems are ignored to support cross-chain swap, so that the efficiency of intra-chain and cross-chain swap in digital currency is greatly improved, and the swap cost in digital currency is greatly reduced.

Figure 5:
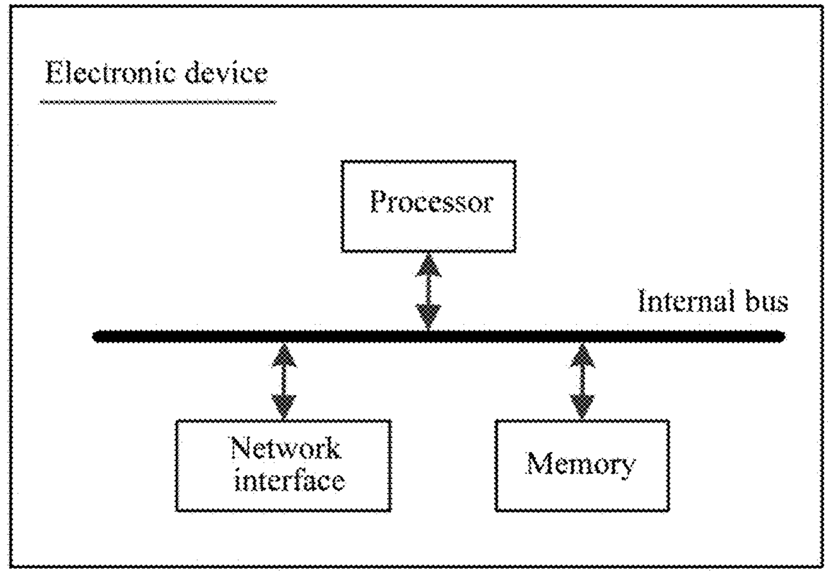
FIG. 5 is a schematic diagram of an electronic device according to an exemplary embodiment.

Correspondingly, the application further provides an electronic device, which includes one or more processors; a memory for storing one or more programs; when the one or more programs are executed by the one or more processors, the one or more processors are enabled to realize the digital currency off-chain swap method based on trusted hardware as described above. As shown in FIG. 5, it is a hardware structure diagram of any device with data processing capability where the digital currency off-chain swap method based on trusted hardware provided by the embodiment of the present disclosure is located. In addition to the processor, memory and network interface shown in FIG. 5, any device with data processing capability in the embodiment can usually include other hardware according to the actual functions of the device with data processing capability, which will not be described here again.

Correspondingly, the application further provides a non-transitory computer-readable storage medium, on which computer instructions are stored, which, when executed by a processor, realize the above-mentioned digital currency off-chain swap method based on trusted hardware. The non-transitory computer-readable storage medium can be an internal storage unit of any device with data processing capability as described in any of the previous embodiments, such as a hard disk or a memory. The non-transitory computer-readable storage medium can further be an external storage device, such as a plug-in hard disk, Smart Media Card (SMC), SD card, Flash Card, etc. provided on the device. Further, the non-transitory computer-readable storage medium can further include both internal storage units and external storage devices of any device with data processing capability. The non-transitory computer-readable storage medium is used for storing the computer program and other programs and data required by any device with data processing capability, and can further be used for temporarily storing data that has been output or will be output.

Other embodiments of the present disclosure will easily occur to those skilled in the art after considering the specification and practicing the disclosure herein. The present disclosure is intended to cover any variations, uses or adaptations of the present disclosure, which follow the general principles of the present disclosure and include common sense or common technical means in this technical field that are not disclosed in the present disclosure.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

It should be understood that the present disclosure is not limited to the precise structure described above and shown in the drawings, and various modifications and changes can be made without departing from its scope.

What is claimed is:

1. A method for digital currency intra-chain and cross-chain off-chain swaps based on trusted hardware, comprising:

step (1) randomly generating, by a trusted hardware system of an initiator, a public-private key pair $$(pk_A^{TEE}, sk_A^{TEE}),$$

generating a signature $\sigma_A$ for a public key $$pk_A^{TEE}$$

by using a signature private key $\widetilde{sk}_A^{\mathrm{TEE}}$ of the trusted hardware system of the initiator, and sending the public key $$pk_A^{TEE}$$

and the signature $\sigma_A$ to a software system of the initiator;

step (2) calculating, by the software system of the initiator, a digital currency address addr through the public key $$pk_A^{TEE},$$

and depositing a digital currency into the digital currency address through a blockchain; sending, by the software system of the initiator, the public key $$pk_A^{TEE},$$

a type of the digital currency, an initiator rescue address $addr_A$ preset by the initiator and an earliest rescue time $t_A$ expected by the initiator to the trusted hardware system of the initiator, requesting the hardware system of the initiator to generate a rescue object for $$(pk_A^{TEE}, sk_A^{TEE}),$$

and returning, by the trusted hardware system of the initiator, the generated rescue object and a signature $\sigma_{t_A}$;

step (3) randomly generating, by a trusted hardware system of a responder, a public-private key pair $$(pk_B^{TEE}, sk_B^{TEE}),$$

generating a signature op for a public key $$pk_B^{TEE}$$

by using a signature private key $\widetilde{sk}_B^{\mathrm{TEE}}$ of the trusted hardware system of the responder, and returning the public key $$pk_B^{TEE}$$

and the signature $\sigma_B$ to the software system of the responder;

step (4) calculating, by the software system of the responder, a digital currency address addr' through the public key $$pk_B^{TEE},$$

and depositing a digital currency into the digital currency address through a blockchain; sending, by the software system of the responder, the public key $$pk_B^{TEE},$$

a type of the digital currency, an responder rescue address $addr_B$ preset by the responder, and an earliest rescue time $t_B$ expected by the responder to the trusted hardware system of the responder, requesting the rusted hardware system of the responder to generate a rescue object for $(pk_B^{TEE}, sk_B^{TEE})$ and returning, by the trusted hardware system of the responder, the generated rescue object and a signature $\sigma_{t_B}$;

step (5) sending, by the software system of the initiator, the digital currency address addr and the earliest rescue time $t_A$ expected by the initiator to the software system of the responder, and verifying, by the software system of the responder, whether there is a corresponding digital currency at addr and confirming whether to accept the earliest rescue time $t_A$ expected by the initiator; when the responder does not accept the earliest rescue time t expected by the initiator, terminating a transaction, otherwise, determining whether $t_B$–t is greater than two fixed time intervals, when $t_B$–$t_A$ being not greater than the two fixed time intervals, terminating the transaction, and when $t_B$–$t_A$ being greater than the two fixed time intervals, and sending, by the software system of the responder, a trusted hardware signature public key $\widetilde{pk}_B^{TEE}$ of the responder and a trusted hardware encryption public key $\widehat{pk}_B^{TEE}$ of the responder to the software system of the initiator;

step (6) sending, by the software system of the responder, the digital currency address addr' and the earliest rescue time $t_B$ expected by the responder to the software system of the initiator, and verifying, by the software system of the initiator, whether there is a corresponding digital currency at addr' and confirming whether to accept the earliest rescue time $t_B$ expected by the responder; when the initiator does not accept the earliest rescue time $t_B$ expected by the responder, terminating a transaction, otherwise, determining whether $t_B$–$t_A$ is greater than two fixed time intervals, when $t_B$–$t_A$ being not greater than the two fixed time intervals, terminating the transaction, and when $t_B$–$t_A$ being greater than the two fixed time intervals, and sending, by the software system of the initiator, a trusted hardware signature public key $\widetilde{pk}_A^{TEE}$ of the initiator and a trusted hardware encryption public $\widehat{pk}_A^{TEE}$ of the initiator to the software system of the responder;

step (7) sending, by the software system of the initiator, the public key $pk_A^{TEE}$, the trusted hardware encryption public key $\widehat{pk}_B^{TEE}$ of the responder, and a rescue address $addr_{A'}$ preset by the initiator located in a same blockchain system as the digital currency address addr' to the trusted hardware system of the initiator, and requesting the trusted, hardware system of the initiator to transfer $(pk_A^{TEE}, sk_A^{TEE})$;

and performing, by the trusted hardware system of the initiator, asymmetric encryption on $sk_A^{TEE}$, by using $\widehat{pk}_B^{TEE}$, to generate a ciphertext $C_A$, deleting $(pk_A^{TEE}, sk_A^{TEE})$ from a confidential storage space, and signing $C_A$ and $addr_{A'}$, respectively, by using the trusted hardware signature private key $\widetilde{sk}_A^{TEE}$ to generate signatures $\sigma_{C_A}$ and $\sigma_{addr_{A'}}$, and sending $C_A$, $\sigma_{C_A}$, and $\sigma_{addr_{A'}}$ to the software system of the initiator;

step (8) sending, by the software system of the initiator, the public key $pk_A^{TEE}$, the signature $\sigma_A$, the ciphertext $C_A$, the signature $\sigma_{C_A}$, the earliest rescue time $t_A$ expected by the initiator, the signature $\sigma_{C_A}$, the rescue address $addr_{A'}$ of the initiator and the signature $\sigma_{addr_{A'}}$ to the software system of the responder;

step (9) sending, by the software system of the responder, the public key $pk_A^{TEE}$, the signature $\sigma_A$, the ciphertext $C_A$, the signature $\sigma_{C_A}$, the earliest rescue time $t_A$ expected by the initiator, the signature $\sigma_{t_A}$, the rescue address $addr_{A'}$ of the initiator, the signature $\sigma_{addr_{A'}}$, the trusted hardware signature public key $\widetilde{pk}_A^{TEE}$ of the initiator, the trusted hardware encryption public key $\widehat{pk}_A^{TEE}$ of the initiator, the public key $pk_B^{TEE}$, the earliest rescue time $t_B$ expected by the responder, the signature $\sigma_{t_B}$, and a rescue address $addr_{B'}$ preset by the responder located in a same blockchain system as the digital currency address addr to the trusted hardware of the responder, using, by the trusted hardware system, $\widetilde{pk}_A^{TEE}$ to verify whether $\sigma_A$ is a signature for $pk_A^{TEE}$ by the trusted hardware system of the initiator using $\widetilde{sk}_A^{TEE}$, whether $\sigma_{C_A}$ is a signature for $C_A$ by the trusted hardware system of the initiator using $\widetilde{sk}_A^{TEE}$, whether $\sigma_{t_A}$ is a signature for $t_A$ by the trusted hardware system of the initiator using $\widetilde{sk}_A^{TEE}$, whether $\sigma_{addr_{A'}}$ is a signature for $addr_{A'}$ by the trusted hardware system of the initiator using $\widetilde{sk}_A^{TEE}$, and using $\widetilde{pk}_B^{TEE}$ to verify whether $\sigma_{t_B}$ is signature for $t_B$ by the trusted hardware system of the responder using $\widetilde{sk}_B^{TEE}$, when verifying being passed, verifying whether $t_B$–$t_A$ is greater than two fixed time intervals, and when verifying being further passed, performing, by $\widehat{sk}_B^{TEE}$, asymmetric decryption on $C_A$ to obtain $sk_A^{TEE}$, storing $(pk_A^{TEE}, sk_A^{TEE})$ into the confidential storage space of the trusted hardware system of the responder, setting the public-private key pair to a locked state, and deleting $(pk_B^{TEE}, sk_B^{TEE})$ from the confidential storage space; performing, by the trusted hardware system of the responder, asymmetric encryption on $sk_B^{TEE}$ by using $\widetilde{pk}_A^{TEE}$, to generate a ciphertext $C_B$, and sign $C_B$ by using the trusted hardware signature private key $\widetilde{sk}_B^{TEE}$ to generate a signature $\sigma_{C_B}$; and generating, by the trusted hardware of the responder, a special rescue object for $(pk_A^{TEE}, sk_A^{TEE})$, with an expected rescue time being a time $t'_A$ that is earlier than $t_A$ by at least a fixed time interval, with a rescue address being $addr_{B'}$, with a payload being the data of a blockchain transaction $tx_{R'}$ of immediately transferring from addr' to $addr_{A'}$ that meets a digital currency type, and returning, by the trusted hardware system of the responder, $C_B$, $\sigma_{C_B}$ and the special rescue object to the software system of the responder;

step (10) sending, by the software system of the responder, the public key $pk_B^{TEE}$, the signature $\sigma_B$, the ciphertext $C_B$, the signature $\sigma_{C_B}$, the earliest rescue time $t_B$ expected by the responder and the signature $\sigma_{t_B}$ to the software system of the initiator;

step (11) sending, by the software system of the initiator, the public key $pk_B^{TEE}$, the signature $\sigma_B$, the ciphertext $C_B$, the signature $\sigma_{C_B}$, the earliest rescue time $t_B$ expected by the responder and the signature $\sigma_{t_B}$, the trusted hardware signature public key $\widetilde{pk}_B^{TEE}$ of the responder, the earliest rescue time $t_A$ expected by the initiator and the signature $\sigma_{t_A}$ to the trusted hardware system of the initiator, using, by the trusted hardware system of the initiator, $\widetilde{pk}_B^{TEE}$ to verify whether $\sigma_B$ is a signature for $pk_B^{TEE}$ by the trusted hardware system of the responder using $\widetilde{sk}_B^{TEE}$, whether $\sigma_{C_B}$ is a signature for $C_B$ by the trusted hardware system of the responder using $\widetilde{sk}_B^{TEE}$, and whether $\sigma_{t_B}$ is a signature for $t_B$ by the trusted hardware system of the responder using $\widetilde{sk}_B^{TEE}$, and using $\widetilde{pk}_A^{TEE}$ to verify whether $\sigma_{t_A}$ is a signature for $t_A$ by the trusted hardware system of the initiator using $\widetilde{sk}_A^{TEE}$, when verifying being passed, verifying whether $t_B - t_A$ is greater than two fixed time intervals, and when verifying being further passed, performing, by $\widetilde{sk}_A^{TEE}$, asymmetric decryption on $C_B$ to obtain $sk_B^{TEE}$, storing $(pk_B^{TEE}, sk_B^{TEE})$ into the confidential storage space of the trusted hardware system of the initiator, signing, by $\widetilde{sk}_A^{TEE}$, $pk_B^{TEE}$ to generate a signature $\sigma_{B'}$, performing, by $\widetilde{pk}_A^{TEE}$, asymmetric encryption on a completion symbol to generate a ciphertext $C'_A$, signing, by $\widetilde{sk}_A^{TEE}$, $C'_A$ to generate a signature $\sigma_{C'_A}$, and returning $\sigma_{B'}$, $C'_A$, and $\sigma_{C'_A}$ to the software system of the initiator;

step (12) sending, by the software system of the initiator, the ciphertext $C'_A$ and the signature $\sigma_{C'_A}$ to the software system of the responder; and step (13) sending, by the software system of the responder, the ciphertext $C'_A$, the signature $\sigma_{C'_A}$ and the trusted hardware signature public key $\widetilde{pk}_A^{TEE}$ of the initiator to the trusted hardware system of the responder, using, by the trusted hardware system of the responder, $\widetilde{pk}_A^{TEE}$ to verify whether $\sigma_{C'_A}$ is a signature for $C'_A$ by the trusted hardware system of the initiator using $\widetilde{sk}_A^{TEE}$, when the verifying being passed, performing, by $\widetilde{sk}_B^{TEE}$, asymmetric decryption on $C'_A$, and when the ciphertext $C'_A$ being decrypted to obtain the completion symbol, removing the locked state of $(pk_A^{TEE}, sk_A^{TEE})$, signing, by $\widetilde{pk}_B^{TEE}$, $$pk_{A}^{TEE}$$

to generate a signature $\sigma_{A'}$, and returning $\sigma_{A'}$ to the software system of the responder, so as to avoid on-chain swap and improve efficiency of intra-chain and cross-chain swap in digital currency.

2. The method according to claim 1, further comprising: when the initiator needs to withdraw the digital currency in the digital currency account/address addr' corresponding to $$pk_{B}^{TEE}$$

after executing the step (13), following steps are executed:

inputting, by the initiator, a public key $pk_{A'}$ and the public key $$pk_{B}^{TEE}$$

to the trusted hardware system of the initiator through the software system of the initiator, requesting the trusted hardware system of the initiator to transfer $$(pk_{B}^{TEE}, sk_{B}^{TEE}),$$

performing, by the trusted hardware the initiator, asymmetric encryption on $$sk_{B}^{TEE},$$

by using $pk_{A'}$, to generate a ciphertext $C_{B'}$, deleting $$(pk_{B}^{TEE}, sk_{B}^{TEE})$$

from the confidential storage space, signing, by the trusted hardware signature private key $\widetilde{sk}_A^{TEE}$, $C_{B'}$ to generate a signature $\sigma_{C_{B'}}$, and returning $C_B$, and $\sigma_{C_{B'}}$ to the software system of the initiator; and using, by the software system of the initiator, $\widetilde{pk}_A^{TEE}$ to verify whether $\sigma_{B'}$ is a signature for $$pk_{B}^{TEE}$$

by the trusted hardware system of the initiator using $\widetilde{sk}_A^{TEE}$, using $\widetilde{pk}_A^{TEE}$ to verify whether $\sigma_{C_{B'}}$ is the signature for $C_{B'}$ by the trusted hardware system of the initiator using $\widetilde{sk}_A^{TEE}$, when verifying being passed, decrypting, by the corresponding private key $sk_{A'}$ of the public key $pk_{A'}$, the ciphertext $C_{B'}$ to obtain $$sk_{B}^{TEE},$$

using, by the software system of the initiator, $$(pk_{B}^{TEE}, sk_{B}^{TEE})$$

to generate a transaction of transferring from addr' to a personal digital currency address of the initiator, and submitting the transaction to the blockchain for digital currency withdrawal.

3. The method according to claim 1, further comprising: when the responder needs to withdraw the digital currency in the digital currency account/address addr corresponding to $$pk_{A}^{TEE}$$

after executing the step (13), following steps are executed:

inputting, by the responder, a public key $pk_{B'}$ and the public key $$pk_{A}^{TEE}$$

to the trusted hardware system of the responder through the software system of the responder, requesting the trusted hardware system of the responder to transfer $$(pk_{A}^{TEE}, sk_{A}^{TEE}),$$

and performing, by the trusted hardware the responder, asymmetric encryption on $$sk_{A}^{TEE}$$

by using $pk_{B'}$, to generate a ciphertext $C_{A'}$, deleting $$(pk_{A}^{TEE}, sk_{A}^{TEE})$$

from the confidential storage space, signing, by the trusted hardware signature private key $\widetilde{sk}_B^{TEE}$, $C_{A'}$ to generate a signature $\sigma_{C_{A'}}$, and returning $C_{A'}$ and $\sigma_{C_{A'}}$ to the software system of the responder; and using, by the software system of the responder, $\widetilde{pk}_B^{TEE}$ to verify whether $\sigma_{A'}$ is a signature for $$pk_{A}^{TEE}$$

by the trusted hardware system of the responder using $\widetilde{sk}_B^{TEE}$, and using $\widetilde{pk}_B^{TEE}$ to verify whether $\sigma_{C_{A'}}$ is the signature for $C_{A'}$ by the trusted hardware system of the responder using $\widetilde{sk}_B^{TEE}$, when verifying being passed, decrypting, by the corresponding private key $sk_{B'}$ of the public key $pk_{B'}$, the ciphertext $C_{B'}$ to obtain $$sk_A^{TEE},$$

using, by the software system of the responder, $$\left(pk_A^{TEE}, sk_A^{TEE}\right)$$

to generate a transaction of transferring from addr to a personal digital currency address of the responder, and submitting the transaction to the blockchain for digital currency withdrawal.

4. The method according to claim 1, wherein the step (2) further comprises:

for a digital currency comprising but not limited to bitcoin and supporting deferred transactions, generating, by the trusted hardware system of the initiator, a transaction $tx_A$ signed with $$sk_A^{TEE},$$

with a nTimeLock field being the earliest rescue time $t_A$ expected by the initiator and a SIGHASH flag bit being SIGHASH_ALL, and transferred from addr to $addr_A$, and returning the transaction $tx_A$ to the software system of the initiator as a rescue object;

for a digital currency comprising but not limited to Ethereum and supporting smart contracts but not deferred transactions, generating, by the trusted hardware system of the initiator, a called transaction $call_A$ that calls a deferred transfer function of a smart contract that supports the deferred transactions to realize transferring from addr to $addr_A$ and has an earliest executable time of $t_A$, and returning the transaction $call_A$ to the software system of the initiator as a rescue object; and for a digital currency neither supporting deferred transactions nor smart contracts, obtaining, by the trusted hardware system of the initiator, a current time $t_{now}$ through a trusted clock or trusted timing point, and generates a time lock puzzle $puzzle_A$ with a secret being a blockchain transaction that immediately transfers the digital currency at addr to $addr_A$, a computing performance being a current computing performance constant and an unlocking duration being $t-t_{now}$ through a generation algorithm in time lock puzzle algorithms, and returning the time lock puzzle $puzzle_A$ to the software system of the initiator as a rescue object.

5. The method according to claim 1, wherein using, by the initiator, the rescue object to retrieve the digital currency deposited at addr to the rescue address $addr_A$ of the initiator after $t_A$ further comprises:

for a digital currency comprising but not limited to Bitcoin and supporting deferred transactions, after submitting the earliest rescue time $t_A$ expected by the initiator, submitting, by the initiator, $tx_A$ to a blockchain system through the software system of the initiator or any blockchain client supporting the digital currency, and retrieving the digital currency deposited at addr to the rescue address $addr_A$ after confirmation by the blockchain system;

for a digital currency, comprising but not limited to Ethereum and t supporting smart contracts but not deferred transactions, after submitting the earliest rescue time $t_A$ expected by the initiator, submitting, by the initiator, $call_A$ to the blockchain system through the software system of the initiator or any blockchain client that supports the digital currency, and retrieving the digital currency deposited at addr to the rescue address $addr_A$ after confirmation by the blockchain system;

for a digital currency neither supporting deferred transactions nor smart contracts, immediately starting, by the initiator, to execute a decryption algorithm of the corresponding time lock puzzle algorithm after obtaining a time lock puzzle $puzzle_A$, and solving, by the initiator, $puzzle_A$ to obtain $$sk_A^{TEE}$$

before and after the earliest rescue time $t_A$ expected by the initiator, generating a transaction of transferring from addr to the personal digital currency address of the initiator with the software system, and submitting the transaction to the blockchain to retrieve the digital currency.

6. The method according to claim 1, wherein the step (4) further comprises:

for the digital currency comprising but not limited to Bitcoin and supporting deferred transactions, generating, by the trusted hardware system of the responder, a transaction $tx_B$ signed with $$sk_B^{TEE},$$

with a nTimeLock field being the earliest rescue time $t_B$ expected by the responder, and a SIGHASH flag bit being SIGHASH_ALL, and transferred from addr' to $addr_B$, and returning the transaction $tx_B$ to the software system of the responder as a rescue object;

for the digital currency comprising but not limited to Ethereum and supporting smart contracts but not deferred transactions, generating, by the trusted hardware system of the responder, a called transaction $call_B$ that calls a deferred transfer function of a smart contract that supports the deferred transactions to realize transferring from addr' to $addr_B$ and has an earliest executable time of $t_B$, and returning the transaction $call_B$ to the software system of the responder as a rescue object; and for the digital currency neither supporting deferred transactions nor smart contracts, obtaining, by the trusted hardware system of the responder, a current time $t_{now'}$ through a trusted clock or trusted timing point, and generates a time lock puzzle $puzzle_B$ with a secret being a blockchain transaction that immediately transfers the digital currency at addr' to $addr_B$, a computing performance being a current computing performance constant and an unlocking duration being $t_B-t_{now'}$, through a generation algorithm in time lock puzzle algorithms, and returning the time lock puzzle $puzzle_B$ to the software system of the responder as a rescue object.

7. The method according to claim 1, further comprising: after the step (10), when the responder does not receive a reply from the responder after waiting for any period of time and guesses that the initiator is a malicious party, submitting the special rescue object obtained in the step (9) to the digital currency system where addr is located after $t'_A$ by a corresponding rescue method, and transferring the digital currency at addr to $addr_B$, to terminate a swap.

8. The method according to claim 1, further comprising: when the initiator finds out, by a blockchain browser built in the software system of the initiator or other blockchain browsers or any method, that the digital currency at addr is taken out before $t_A$, determining that the responder uses the special rescue object for retrieval, and the initiator extracts, by the blockchain browser built in the software system of the initiator or other blockchain browsers or any method, $tx_{R'}$, from the payload of the transaction of the digital currency taken out from addr, submits $tx_{R'}$ to the blockchain, and transfers the digital currency at addr' to the rescue address $addr_A$ preset by the initiator to complete a swap.

9. An electronic device, comprising:

one or more processors; and a memory for storing one or more programs;

wherein the one or more programs, when executed by the one or more processors, cause the one or more processors to implement the method according to claim 1.

10. A non-transitory computer-readable storage medium on which computer instructions are stored, wherein the instructions, when executed by a processor, is configured to implement the method according to claim 1.

* * * * *